United States Patent [19]
Baker et al.

[11] Patent Number: 4,523,269
[45] Date of Patent: Jun. 11, 1985

[54] SERIES RESONANCE CHARGE TRANSFER REGULATION METHOD AND APPARATUS

[75] Inventors: Richard H. Baker, Bedford, Mass.; David L. Chu, Summit, N.J.; Derek Chambers, Bayville, N.Y.

[73] Assignee: Reliance Electric Company, Cleveland, Ohio

[21] Appl. No.: 552,335

[22] Filed: Nov. 16, 1983

[51] Int. Cl.³ ............................................. H02M 7/515
[52] U.S. Cl. .................................... 363/138; 307/110; 320/1; 363/17; 363/43; 363/98
[58] Field of Search ............... 307/110; 320/1; 363/17, 363/43, 96, 97, 98, 136, 137, 138

[56] References Cited
U.S. PATENT DOCUMENTS

| 3,902,107 | 8/1975 | Brown | 363/136 |
| 3,939,392 | 2/1976 | Chalmers et al. | 363/96 |
| 4,191,993 | 3/1980 | Kratz et al. | 363/138 |
| 4,191,994 | 3/1980 | Kratz et al. | 363/138 |

Primary Examiner—Peter S. Wong
Assistant Examiner—D. L. Rebsch
Attorney, Agent, or Firm—James A. Hudak

[57] ABSTRACT

A DC to N phase AC converter, where N is an integer greater than 2, includes a DC source having first and second terminals for deriving equal amplitude opposite polarity DC voltages, a series resonant circuit, and N output terminals, one for each phase of the converter. The series resonant circuit is selectively connected in series with the first and second terminals and the N output terminals for an interval equal to one half cycle of the resonant circuit resonant frequency, so that current flows between a selected one of the first and second terminals and the resonant circuit and a selected one of the N output terminals during the interval. The resonant circuit current is zero at the beginning and end of the interval. A capacitor shunting each of the output terminals has a value relative to the capacitance of the series resonant circuit such that the voltage across each output terminal remains approximately constant between adjacent exchanges of energy between the resonant circuit and the output terminal. The selective connection is in response to a comparison of the actual voltage across each of the N output terminals and a reference voltage for each of the N output terminals. The comparison controls when the flow of current between the selected first and second terminals and the selected output terminal via the resonant circuit begins. The frequency of the AC voltage developed across the N output terminals is much less than the resonant frequency of the circuit.

56 Claims, 21 Drawing Figures

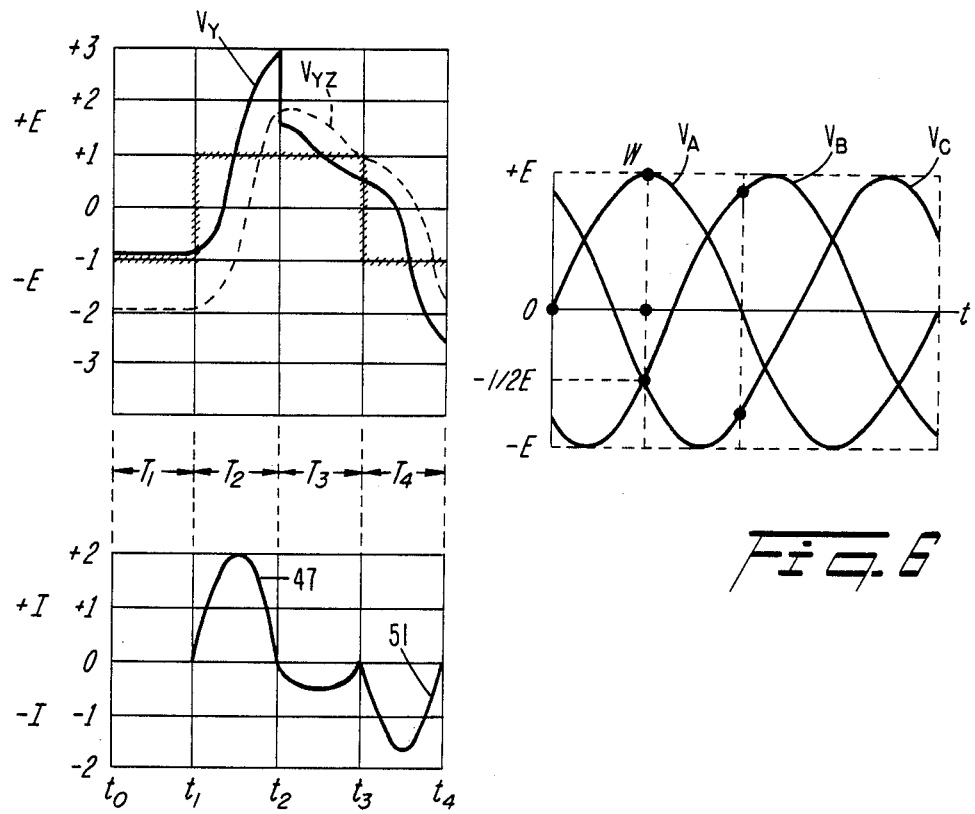
Fig. 4
Fig. 6
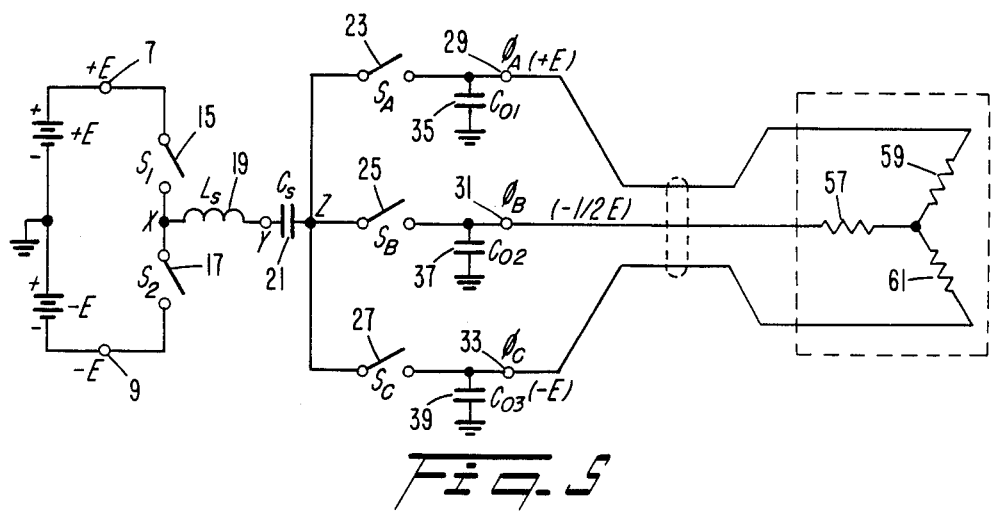
Fig. 5

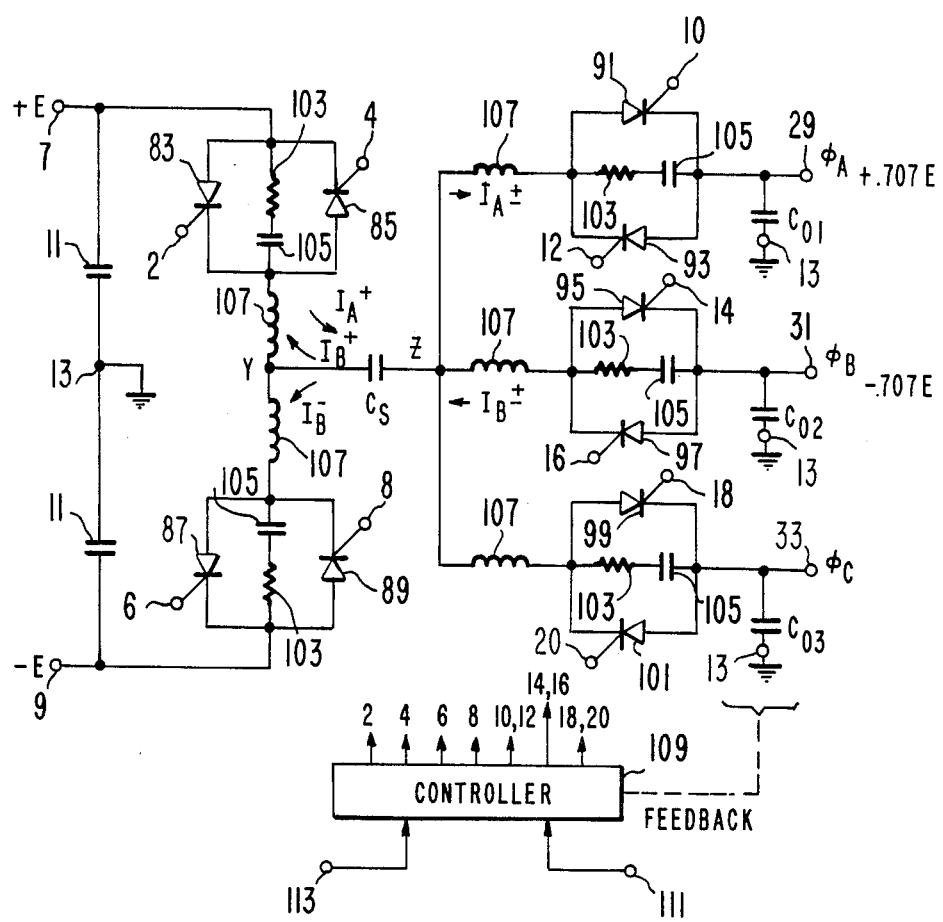
_Fig_10A_
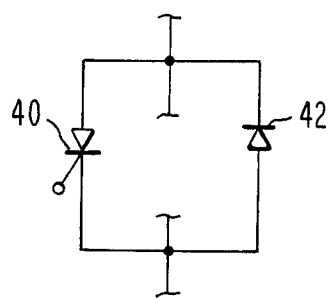
_Fig_10B_
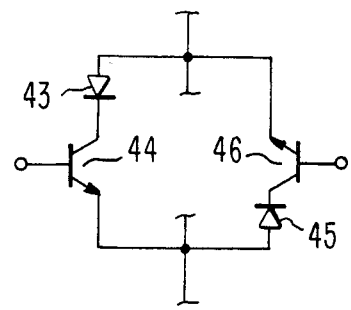
_Fig_10C_

CTR IMPLEMENTATION WITH SCR DEVICE

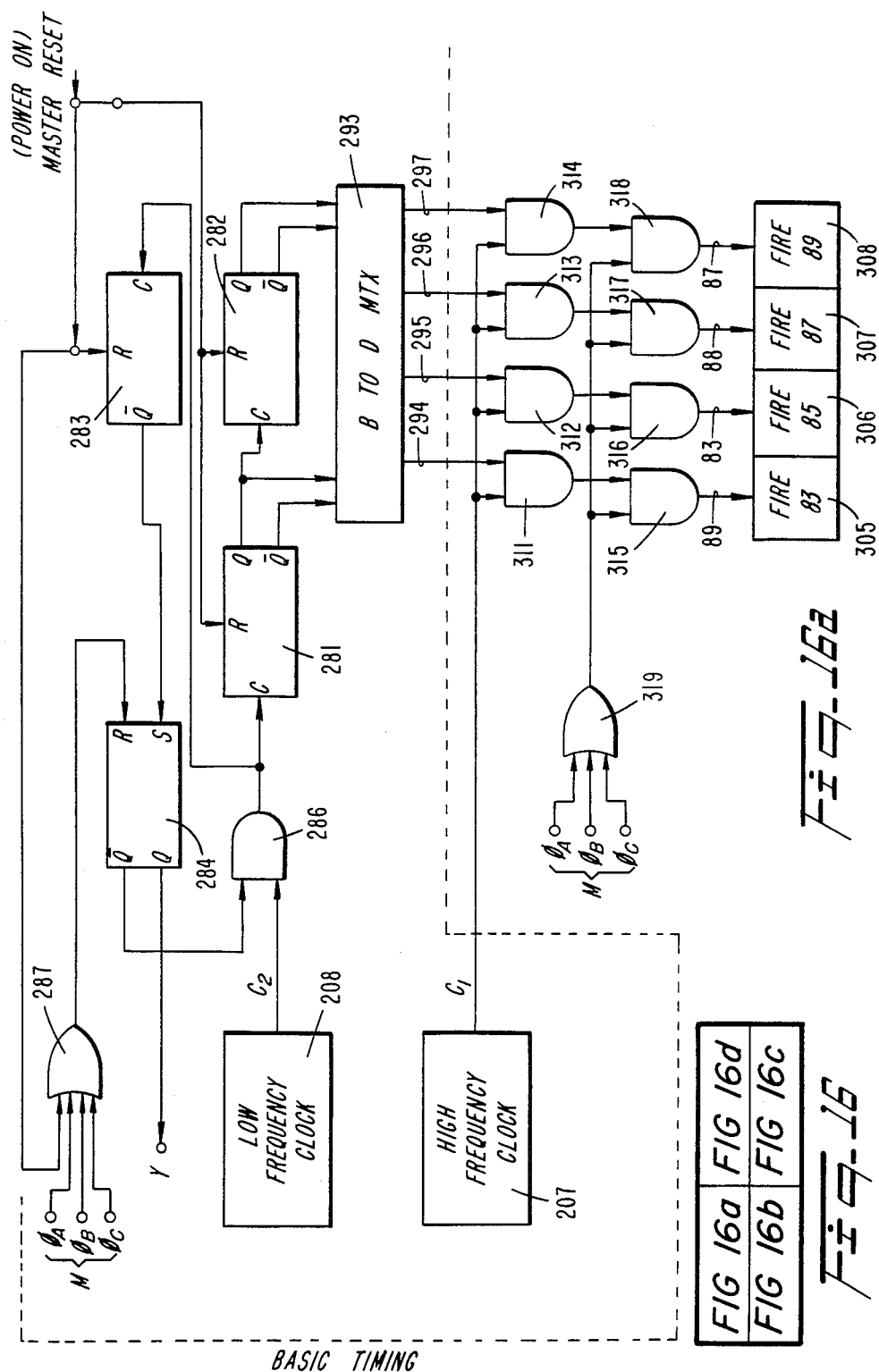

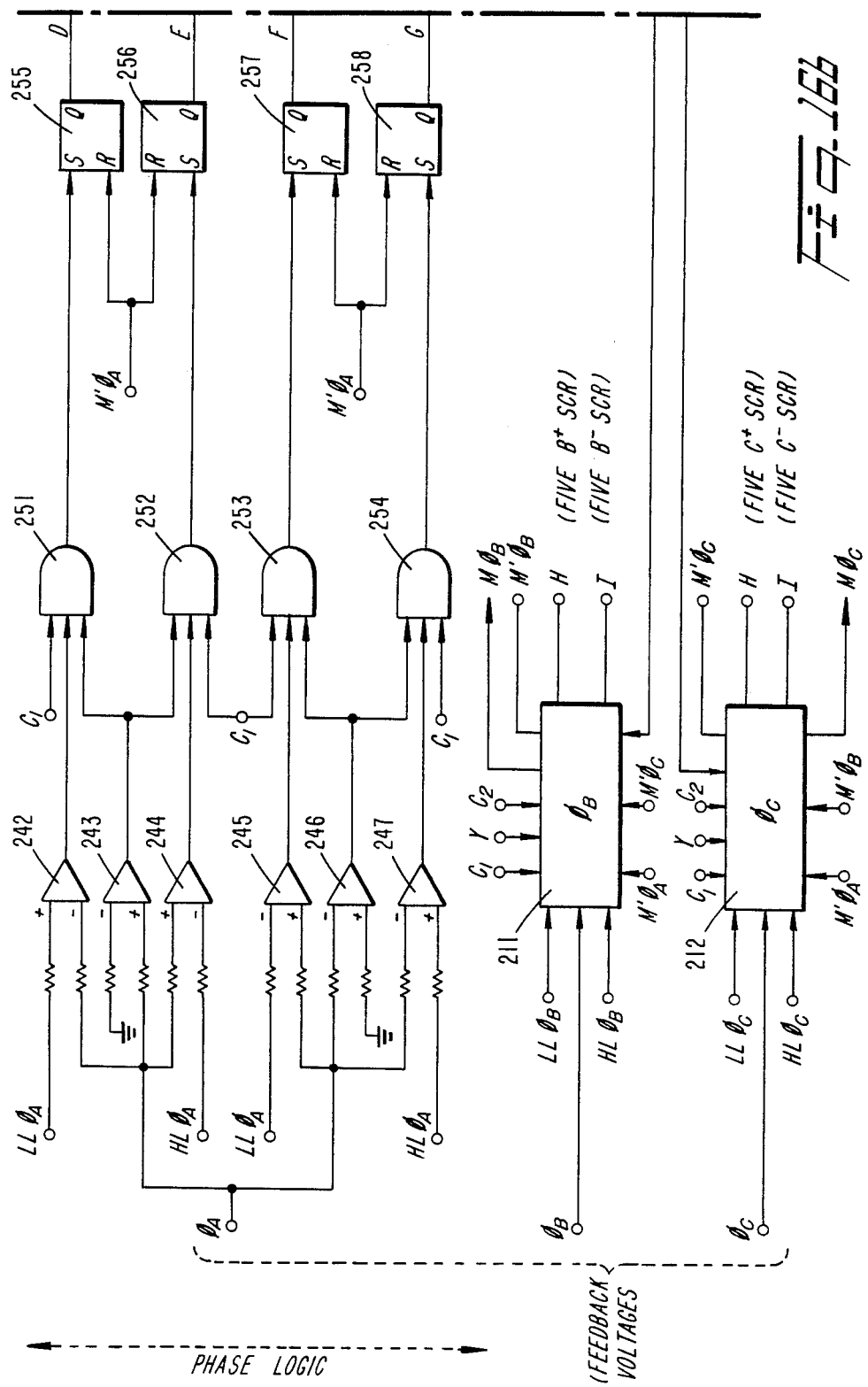

SERIES RESONANCE CHARGE TRANSFER REGULATION METHOD AND APPARATUS

FIELD OF THE INVENTION

The present invention relates generally to a method of and apparatus for regulating a load, such as in a converter system where a resonant circuit is employed, and more particularly to such a method and apparatus where the resonant circuit capacitance is charged to a level determined by the voltage across the load being regulated; in another aspect, the invention relates to instigating the flow of current between a source and the load via the resonant circuit at a time determined by the relative amplitudes of the load voltage and a predetermined value for the load voltage.

BACKGROUND OF THE INVENTION

There are many known load regulating systems, such as employed in systems for converting DC to DC, DC to constant frequency AC, AC to AC and DC to variable frequency AC Many of these converter systems have low output impedance and, therefore, are essentially voltage sources. Voltage source systems usually operate to connect a source of DC voltage intermittently to a load via periodic connections and disconnections established by input and output power switches. The power switches are operated in a predetermined pattern to obtain a desired output wave form, in many instances a stepwise approximation of an ideal wave form for an AC output voltage.

Variable voltage, variable frequency AC output converter systems frequently employ power transistors and/or silicon-controlled-rectifiers to modulate a source to load power flow path. When such converters utilize silicon controlled rectifiers, they must be force commutated, requiring large currents to be diverted from one semiconductor switch path to a second semiconductor switch path in the presence of voltage, to turn off the silicon controlled rectifiers. Power transistors, which can be actively controlled via base electrodes for both turn on and turn off, when used for switches in such converters need not be force commutated from a conducting to a non-conducting state. However, power transistors normally require extensive snubbing, which is usually accomplished with passive circuit elements that dissipate substantial power as the power transistors are activated and deactivated. Silicon controlled rectifiers normally require active auxiliary high power circuit components for force commutating to the cutoff condition.

Load regulation, particularly in converter systems, has been proposed in the prior art by connecting a resonant circuit between a source and load. The resonant circuit is activated typically for an interval equal to one half cycle of the resonant circuit. Thus, half wave sinusoidal pulses are applied via the resonant circuit to the load. In converters operating on this principle, the period of each half sinusoidal current pulse supplied by the resonant circuit to the load is considerably shorter than the period of an AC output wave supplied by the converter to a load.

The prior art resonant circuit systems are relatively complex, employing computers or relatively complex circuitry for controlling the application of the current pulses from the resonant circuit to the load. In one system, a computer selects connections between several input terminals and several output terminals by calculating the connection which results in the least square error between the desired and expected voltages at the output terminals. In another proposed system, connections between several input sources and an output load terminal are changed while current is flowing from one input terminal to the output terminal. This is performed to stabilize the current supplied by the resonant circuit to the load during each application of current from the sources to the load. The change in current is performed by switching between positive and negative voltage sources during each current pulse.

These prior art systems are also characterized, particularly during start up for motor loads, i.e., at low motor speed, by numerous non-allowed states between the several input sources and the output terminals. The numerous non-allowed states can be particularly deleterious on the operation of a motor load because it can cause cogging of the motor, and instability to such an extent that the motor does not run. The number of non-allowed states is great enough in many situations to interrupt the flow of current to the load for an interval that is a substantial fraction of a cycle of the AC voltage driving the motor.

It is, accordingly, an object of the present invention to provide a new and improved apparatus for, and method of regulating a load with, a resonant circuit selectively connected between the load and a source.

Another object of the invention is to provide a new and improved method of, and apparatus for, operating a converter including a series resonant circuit.

Still another object of the invention is to provide a new and improved apparatus for, and method of, supplying power to an AC load with a resonant circuit, wherein the resonant circuit is controlled in a relatively simple manner.

Still another object of the invention is to provide a new and improved apparatus for, and method of, supplying power to an AC load with a resonant circuit having a capacitor that is charged to a level determined by the load voltage.

Still another object of the invention is to provide a new and improved apparatus for, and method of, synthesizing a waveform by means of a resonant circuit connected in series between a source and load across which the synthesized waveform is developed.

DISCLOSURE OF THE INVENTION

In accordance with one aspect of the present invention, a load is regulated so that it has a predetermined voltage by selectively connecting a resonant circuit between the load and a source. The resonant circuit includes a series capacitor, while the load is shunted by a capacitor having a value such that the load voltage remains relatively constant between adjacent exchanges of energy between the resonant circuit and the load. The series capacitor is charged to a level determined by the voltage across the shunt capacitor. The resonant circuit, with the series capacitor charged to that level, is connected in series with the source and load for an interval equal to one half cycle of the resonant frequency of the resonant circuit, so that current of a first polarity flows between the source and the load during the interval via the resonant circuit; the resonant circuit current is zero at the beginning and end of the interval. The current pulse has a maximum amplitude determined by the net voltage ("voltage head") around the loop, i.e., source voltage plus capacitor voltage plus load voltage at the instigation of the current pulse. By controlling the final charge on the capacitor to always be ±2E, the circuit is automatically stabilized, to simplify materially the complexity of circuitry for determining connections between several input and output terminals. In addition, always charging the capacitor to a level of ±2E eliminates the possibility of unallowed states between several input voltage sources and several output load terminals.

In accordance with another aspect of the invention, a load is regulated so it has a predetermined voltage by selectively connecting a resonant circuit between the load and source. The load includes a shunt capacitor having a value such that the load voltage remains relatively constant between adjacent exchanges of energy between the resonant circuit and the load. In this aspect of the invention, the source is connected in series with the resonant circuit and the load for an interval equal to one half cycle of the resonant circuit resonant frequency to apply current from the source and the resonant circuit to the load during the interval. The time when the current flows between the source and the load via the resonant circuit is determined by the relative amplitudes of the load voltage and the predetermined value at which the load is to be regulated. In particular, in response to the load voltage's differing by more than a predetermined amount from the predetermined, i.e., desired value, the resonant circuit supplies a current pulse having a zero amplitude at the beginning and end of the interval to the load.

In a preferred embodiment of the present invention, the series resonant capacitor is charged to the stated level by being connected to a DC voltage source for a period having a predetermined duration equal to the length of the interval. The resonant circuit current is zero at the beginning and end of the period. Approximately all of the charge subsisting across the capacitor at the end of the period subsists across the capacitor at the beginning of the interval. The DC voltage source connected to the series capacitor and load during the period has a polarity opposite to the polarity of the DC source connected to the resonant circuit during the interval.

In response to the load voltage magnitude's being less than the desired value, energy is supplied by the load capacitor to a source of a first polarity during the period; subsequently, energy is supplied by a source of the second polarity to the load during the interval. However, when the load voltage magnitude is greater than the desired value, conditions are reversed, so that during the period the first polarity source supplies energy to the load but during the interval energy is supplied by the load capacitor to the second polarity load. Thus in both situations during the period, the charge on the series capacitor is regulated so that the correct amplitude current pulse flows during the interval. The correct charge is automatically applied to the series capacitor at the beginning of each interval because, during adjacent intervals, opposite polarity output terminals are connected to the resonant circuit.

In accordance with a further aspect of the invention, a DC to N phase AC converter, where N is an integer greater than two, comprises a DC source having first and second terminals for deriving opposite polarity DC voltages. In the preferred embodiment, the opposite polarity DC voltages have equal magnitude. A series resonant circuit is selectively connected in series with the first and second terminals and the N output terminals for an interval equal to one half cycle of the resonant circuit resonant frequency, so that current of a first polarity flows between a selected one of the first and second terminals and the selected one of N output terminals via the resonant circuit during the interval; the resonant circuit current is zero at the beginning and end of the interval. A capacitor shunting each of the output terminals has a value relative to the capacitance of the series resonant circuit, such that the voltage across each output terminal remains approximately constant between adjacent exchanges of energy between the resonant circuit and the selected output terminal. In response to the actual voltage across each of the N output terminals and a reference voltage for each of the N output terminals the appropriate connection is selected, as well as control of the time of instigating of said current flow between the selected first and second terminals and the selected output terminal via the resonant circuit. The frequency of the AC voltage developed across the N output terminals is much less than the resonant frequency of the resonant circuit. This converter is characterized by having relatively simple control circuitry, and there are no non-allowed connections between the input and output terminals.

In the preferred embodiment, the present invention thus basically includes a self-stabilizing, time shared resonant circuit for transferring energy, as half sinusoidal current pulses, at controlled time intervals to individual phases of a multi-phase output to generate multi-phase, variable frequency, variable voltage AC power; in the alternative, desired levels of DC power or an AC output having a fixed frequency and/or voltage can be provided. The resonant circuit capacitor and inductor are connected in series and thereby can be termed as shuttle elements.

The voltage across the shuttle capacitor is automatically stabilized by triggering the resonant circuit during a first half sinusoidal current pulse (i.e., the period) of converter operation to establish the correct charge across the capacitor for coupling of charge from the capacitor to the load during a second half sinusoidal current pulse (i.e., the interval). The initial charging operation during the period is performed in the preferred particularly disclosed embodiment by connecting the selected load terminal and resonant circuit to a first DC voltage source having one polarity. The second half sinusoidal pulse is coupled between the selected load terminal and a second DC voltage source having the opposite polarity, but of equal magnitude, to the first source. If the selected output terminal has the same voltage as the DC source voltage, the first half sinusoidal current pulse has a zero amplitude.

The several output terminals are selected in such a manner as to maintain the average voltage across the shuttle capacitor zero over adjacent pairs of first and second half sinusoidal current pulses. This result is achieved in a balanced, multi-phase system because, over adjacent pairs of first and second pulses, the sum of the charge of the first and second pulses of a first set of pulses applied to an output terminal of a first polarity equals the sum of the charge of the first and second pulses of a second set of pulses applied to an output terminal of a second polarity. The total charge supplied to the shuttle capacitor over each set of pulses is constant and the current which charges the resonant capacitor flows in different directions during adjacent sets of the first and second pulses.

It is, accordingly, still another object of the present invention to provide a new and improved DC to AC converter utilizing resonant circuit techniques.

Another object of the present invention is to provide a self stabilized resonant circuit system for converting DC to AC.

Still another object of the present invention is to provide a DC to multi-phase AC converter employing a resonant circuit wherein connections between the resonant circuit and the DC source are established simply, with no unallowed states.

The above and still further objects, features and advantages of the present invention will become apparent upon consideration of the following detailed description of several specific embodiments thereof, especially when taken in conjunction with the accompanying drawing.

BRIEF DESCRIPTION OF THE DRAWING

FIG. 4 shows waveforms generated during one cycle of operation, using the four-pulse format, where opposite polarity voltages at first and second output terminals are respectively the same value as, and one-half the value of, the DC voltage source;

FIG. 5 is a circuit schematic diagram of a resonant circuit converter connected to drive a balanced three-phase resistive load;

FIG. 6 shows waveforms of the three-phase related sinusoidal voltages produced by the resonant converter circuit of FIG. 5;

FIG. 10A is a circuit diagram of a preferred embodiment of the present invention;

FIGS. 10B and 10C are circuit diagrams for alternative switching means in the converter of FIG. 10A, where the circuit of FIG. 10B or FIG. 10C may be used for the input switch section to the plus and minus source voltages, and the circuit of FIG. 10C, but not the circuit of FIG. 10B, may be used for the output (load) switch section;

FIGS. 16a–d are circuit diagrams of various component circuits in the control system of FIG. 15.

BEST MODE FOR CARRYING OUT THE INVENTION

Figure 1:
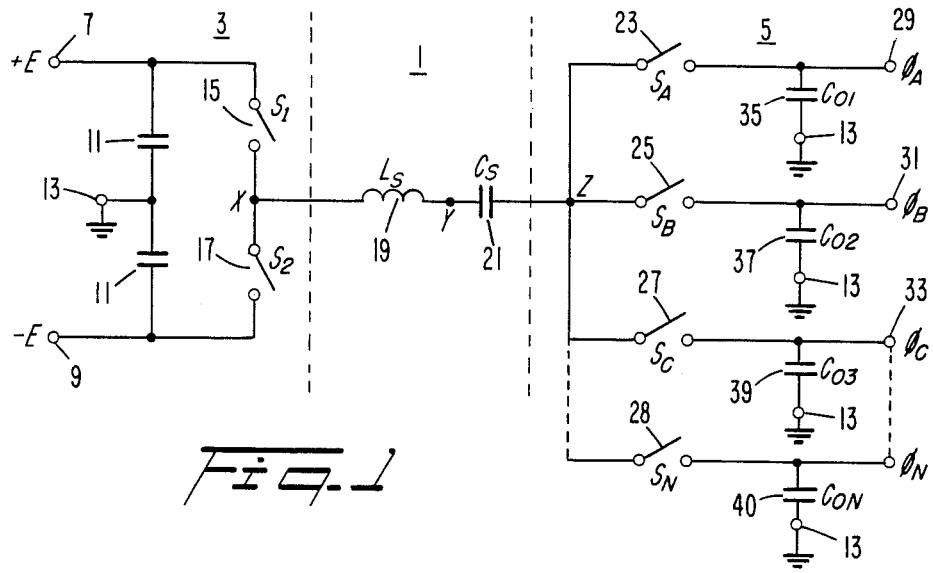
FIG. 1 is a circuit diagram of a simplified resonant circuit converter of the present invention.

Reference is now made to FIG. 1, a simplified circuit diagram for converting DC to N-phase AC (where N is an integer greater than two) using time shared, series resonant circuit 1, connected between input switching section 3 and output switching section 5. Input switching section 3 includes first and second DC power supply voltage terminals 7 and 9, respectively connected to equal magnitude, but opposite polarity voltages $+E$ and $-E$. Filter capacitors 11 shunt the voltages at terminals 7 and 9 to ground terminal 13. Input switches 15 (S1) and 17 (S2) are respectively connected to terminals 7 and 9 and to a common terminal X.

Resonant circuit 1 includes shuttle inductor 19 ($L_S$), in series with shuttle capacitor 21 ($C_S$), connected in series between input stage 3 and output stage 5, i.e., between terminal X of input stage 3 and terminal Z of output stage 5. Terminal Y subsists between inductor 19 and capacitor 21. Resonant circuit 1 has a resonant frequency $$f_o = \frac{1}{2\pi \sqrt{L_s C_s}}.$$

The quality factor (Q) of resonant circuit 1 is relatively high, for example 20 or more, so that there is relatively little damping of voltage and current pulses supplied by resonant circuit 1 to output stage 5. Over the interval of one half cycle of the resonant frequency of resonant circuit 1, the current and voltage waveforms of resonant circuit 1 can be considered as half sinusoids.

Output stage 5 includes N output branches, one for each phase supplied by the converter to an N phase load. Each output circuit branch includes a separate switch and shunt load capacitor $C_{ok}$ (where k is selectively every integer from 1 to N). In the specifically illustrated embodiment, the branches for phases $\phi_1$, $\phi_2$, $\phi_3 \ldots \phi_N$ respectively include series switches 23, 25, 27 ... 28 (also respectively designed as $S_A$, $S_B$, $S_C \ldots S_N$). These switches are connected in series between terminal Z and output terminals 29, 31, 33 ... 34, across which the loads for phases $\phi_1$, $\phi_2$, $\phi_3 \ldots \phi_N$ are connected; load terminals 29, 31, 33 ... 34 are respectively shunted by capacitors 35, 37, 39 ... 40, all of which are also connected to common terminal 13. Capacitors 35, 37, 39 ... 40 all have the same value, approximately ten times the capacitance of capacitor 21, so that the voltage across load terminals 29, 31, 33 ... 34 remains relatively constant between adjacent applications of current from resonant circuit 1 to load terminals 29, 31, 33 ... 34.

The circuit of FIG. 1 is operated so that switches $S_1$ and $S_2$ are sequentially opened and closed, whereby at any time only one of the switches is closed to bi-directionally exchange energy between one of terminals 7 or 9 and resonant circuit 1. Similarly, output switches $S_A$, $S_B$, $S_C$ ... $S_N$ are sequentially activated so that at any one time only one of these switches is closed to bi-directionally exchange energy between circuit 1 and a selected one of output terminals 29, 31, 33 ... 34.

Figure 2:
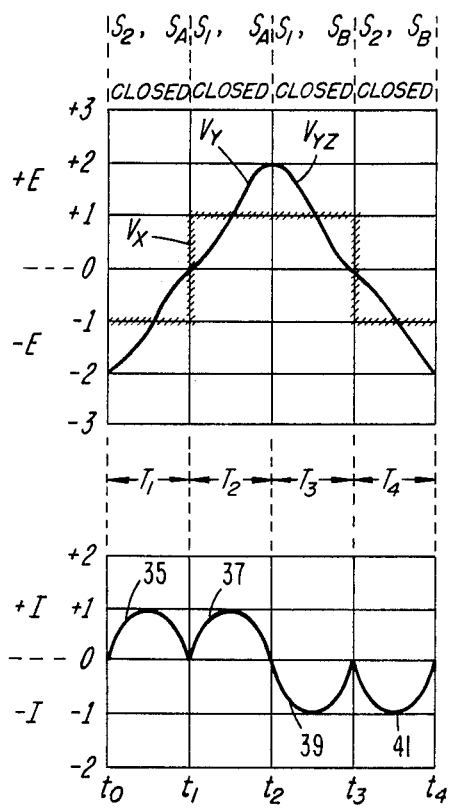
FIG. 2 shows various waveforms generated in the converter circuit of FIG. 1 during one cycle of operation, when separated using the four-pulse format of the present invention under conditions of zero output voltage or a grounded load.

To provide an understanding of the manner in which the circuit of FIG. 1 operates to supply synthesized waveforms to terminals 29 and 31, reference is made to FIG. 2. It is assumed in FIG. 2 that the switches have been activated so that voltages of zero have been initially established across output capacitors 35 and 37, respectively, and that capacitor 21 is charged to a voltage of $+2E$. To establish an initial voltage of $+2E$ or $-2E$ across an initially uncharged (rest to zero) shuttle capacitor 21, switches $S_A$ or $S_B$ or both of these switches are closed while capacitors 35 and 37 are uncharged; then switch 15 is closed to charge capacitor 21 to $+2E$; if capacitor 21 is to be charged to $-2E$, switch $S_2$, instead of switch $S_1$, is closed.

Switches $S_1$, $S_2$, $S_A$ and $S_B$ thereafter are energized in such a manner as to maintain the zero voltages at terminals 29 and 31. These switches are energized in sequential combinations so that a pair of switches is closed during intervals $T_1$, $T_2$, $T_3$, $T_4$, all of which are of equal duration, equal to one half cycle of the resonant frequency of circuit 1, i.e., $\pi\sqrt{LC}$. The switches are activated so that during each of periods $T_1$–$T_4$ a half wave sinusoidal current flows in resonant circuit 1, with a zero current at the beginning and end of each of the $T_1$–$T_4$ intervals.

During intervals $T_1$ and $T_4$, switch $S_2$ is closed, while switch $S_1$ is closed during intervals $T_2$ and $T_3$. During intervals $T_1$ and $T_2$ switch $S_A$ is closed, while switch $S_B$ is closed during intervals $T_3$ and $T_4$. Under the stated conditions, the voltage at terminal X ($V_x$) has a square wave variation, as indicated in FIG. 2, so that $V_x = -E$ during intervals $T_1$ and $T_4$; $V_x = +E$ during intervals $T_2$ and $T_3$. The voltage across capacitor 21 at the beginning of interval $T_1$ is $-2E$, as indicated by waveform $V_{YX}$, FIG. 2. Under the stated initial conditions, during interval $T_1$, a one half sinusoidal positive current pulse, having a normalized value of $+I$ (normalized to $E\sqrt{C_s/L_s}$) flows from left to right through resonant circuit 1, as indicated in FIG. 2 by positive half sinusoidal current pulse 35. In response to the current flowing in resonant circuit 1, the voltage across capacitor 21 ($V_{YZ}$) increases from $-2E$ to zero during interval $T_1$.

At the beginning of interval $T_2$ the voltage ($V_{YZ}$) across capacitor 21 is zero, as is the current flowing in resonant circuit 1. During interval $T_2$ the $+E$ voltage at terminal 7 is connected to resonant circuit 1, which is also connected to the zero volt level at terminal 29, by way of switch $S_A$. The resulting voltage difference across resonant circuit 1 causes a positive half sinusoidal current pulse 37 to flow from left to right in resonant circuit 1, with a resulting increase in the voltage across capacitor 21 from zero volts to $+2E$ volts, as exists at the end of interval $T_2$. Current pulse 37 has a maximum amplitude equal to the maximum amplitude of current pulse 35, which was supplied by resonant circuit 1 during interval $T_1$ to terminal 29.

Because terminal 29 is assumed to be at zero volts, current flows during intervals $T_1$ and $T_2$ from left to right in the resonant circuit 1 but during intervals $T_3$ and $T_4$ current flows from right to left. The net charge transferred to terminal 29 over intervals $T_1$, $T_2$, $T_3$ and $T_4$ sums to zero. Current pulse 35 is derived from negative supply terminal 9 and current pulse 41 is derived from positive supply terminal 41; current pulse 39 flows to the positive supply terminal and pulse 41 flows to the negative supply terminal. Therefore, the voltage on resonant capacitor 21 always goes between $-2E$ and $+2E$ during intervals $T_1$ and $T_2$ and from $+2E$ back to $-2E$ during intervals $T_3$ and $T_4$. Waveforms $V_X$ and $V_{YZ}$ of FIG. 2 show that this is the case for terminal 29 at zero volts.

In summary, in response to the stated initial conditions, at the beginning of interval $T_1$ the voltage across inductor 19 is $+E$, with the left terminal being at a positive voltage relative to the right terminal. The resulting voltage difference initially across inductor 19 causes current pulse 35 to flow from the inductor through terminal 29 and the load, to ground and thence through the negative DC power supply connected between ground and negative terminal 9. At the beginning of interval $T_2$ there is a voltage of E across inductor 19, with the right terminal of the inductor being at a negative voltage relative to terminal X. The resulting voltage causes current pulse 37 to be supplied to load terminal 29. At the beginning of interval $T_3$ there is a voltage of E across inductor 19, with terminal Y being positive relative to terminal X, where current flows from resonant circuit 1 into power supply terminal 7. At the beginning of interval $T_4$ there is a voltage of E across inductor 19, while capacitor 21 is charged to zero volts. These conditions cause current pulse 41 to be supplied to terminal 9 from load terminal 29. Stable operation of resonant circuit 1 is achieved by employing the stated switching sequence, where capacitor 21 is precharged during intervals $T_1$ and $T_3$ by coupling current between load terminals 29 and supply terminals 9 and 7.

Such stable operation is in contrast to the situation which would exist if switches $S_1$ and $S_A$ were closed during interval $T_1$, switches $S_2$ and $S_A$ were closed during interval $T_2$, switches $S_2$ and $S_A$ were closed during interval $T_3$ and switches $S_1$ and $S_A$ were closed during interval $T_4$, etc., assuming lossless components in resonant circuit 1. If such a switching sequence were employed, the voltage across capacitor 21 and the current flowing through the resonant circuit would theoretically increase, without bound. This would prevent maintaining the desired voltages at output terminal 29 in an inherently stable relationship, capable of enabling multi-phase AC voltages to be synthesized.

Figure 3:
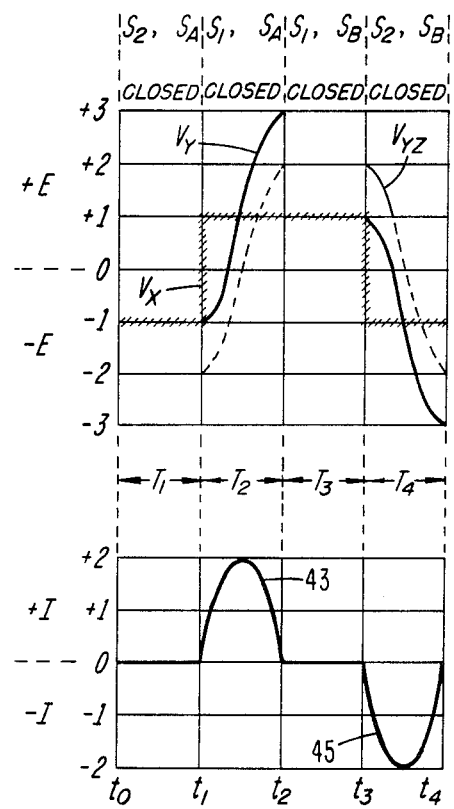
FIG. 3 shows waveforms generated by the converter circuit of FIG. 1 when using a four-pulse format over one cycle of operation, where the voltages at a pair of output terminals are equal but opposite to each other and equal to the voltage of the DC supply.

The operation of the present invention, with the sequence described in connection with FIG. 2, is now described in connection with FIG. 3, assuming that voltages $+E$ and $-E$ respectively exist at terminals 29 and 31, the $\pm E$ voltages at terminals 29 and 31 are to be maintained and that the initial voltage $V_{YZ}$ on capacitor 21 is $-2E$ volts. Because switches $S_1$ and $S_2$ are operated in the sequence as described in connection with FIG. 2, the voltage at terminal X has the same variation as indicated in connection with FIG. 2 by waveform $V_X$, FIG. 3. At the beginning of interval $T_1$, the voltage $V_{YZ}$ across capacitor 21 is at a level of $-2E$, as a result of prior activation of switches $S_1$, $S_2$, $S_A$ and $S_B$. Because of this initial condition, the net voltage across inductor 19 is zero throughout interval $T_1$ when switches $S_1$ and $S_A$ are closed. Thus, no current flows through resonant circuit 1 during interval $T_1$, and the voltage at output terminal 29 remains constant during this interval. During interval $T_2$, while switches $S_1$ and $S_A$ are closed, positive current flows from left to right through resonant circuit 1 between positive power supply terminal 7 and load terminal 29; the current is in the form of a half wave sinusoidal pulse 43, having a maximum normalized amplitude of $$+2I\left(I = E\sqrt{\frac{C_s}{L_s}}\right).$$

During interval $T_2$ the voltage $V_{YZ}$ across capacitor 21 goes from $-2E$ to $+2E$, with a half sine wave variation 90° displaced from the current waveform occurring at this time.

During interval $T_3$, while switches $S_1$ and $S_B$ are closed, the voltage across inductor 19 is zero, so that no current flows between terminals 7 and 31 through resonant circuit 1. Thus, the voltage across capacitor 21 remains at a level of $+2E$ during interval $T_3$. At the beginning of interval $T_4$, during which switches $S_2$ and $S_B$ are initially closed, the voltage across inductor 19 is $+2E$, with the voltage at terminal Y being 2E greater than the voltage at terminal X. In response to these conditions, a halfwave sinusoidal current pulse 45, having a maximum amplitude of $-2I$, flows from right to left through resonant circuit 1 between terminals 31 and 9. In response to the current pulse during $T_4$, the voltage across capacitor 21 decreases in a sinusoidal manner from $+2E$ to $-2E$, the same level as exists across the capacitor at the beginning of interval $T_1$. Thus, stable operation of the circuit is achieved over the interval starting at the beginning of interval $T_1$ and completed at the end of interval $T_4$.

The voltages on capacitor 21 at the beginning of intervals $T_2$ and $T_4$ are automatically set at the correct values for the power pulses during these intervals, a result achieved because zero current automatically flows in resonant circuit 1 during intervals $T_1$ and $T_3$ to achieve stable operation. Such stability occurs automatically in response to the input voltages at terminals 7 and 9 and the actual output voltages at terminals 29 and 31 merely by operating switches $S_1$, $S_2$, $S_A$ and $S_B$ in the stated sequence. This is in contrast to the unstable sequence, as discussed above, where, during a first interval, switches $S_1$ and $S_A$ are simultaneously closed and during a second interval switches $S_2$ and $S_B$ are simultaneously closed. The automatic stabilization achieved by the described four-pulse sequence can not be obtained by the unstable sequence previously described, where stabilization must be accomplished by external or additional control circuitry. The four-pulse format discussed in connection with FIGS. 2 and 3 provides a stabilization mode during intervals $T_1$ and $T_3$ when capacitor 21 is automatically charged to the correct level.

A control system for switches $S_1$, $S_2$, $S_A$, $S_B$, $S_C$... $S_N$ for the converter of the present invention enables the four-pulse format, as described in connection with FIGS. 2 and 3, to be obtained by selecting two different patterns of switch operation over each cycle of converter operation. In the specifically described sequence for the voltage situations described in connection with FIGS. 2 and 3, switches $S_1$ and $S_2$ of input circuit 3 are operated in accordance with the sequence $S_2$, $S_1$, $S_1$ and $S_2$ during intervals $T_1$, $T_2$, $T_3$ and $T_4$. Output switches $S_A$ and $S_B$ are operated in accordance with the sequence $S_A$, $S_A$, $S_B$, and $S_B$ during intervals $T_1$–$T_4$, respectively.

It is to be understood, however, that other sequences can be employed. For example, it is possible to reverse the sequence for the input and output switches so that during intervals $T_1$–$T_4$ switches $S_1$, $S_2$, $S_2$ and $S_1$ are respectively closed, simultaneously with closure of switches $S_B$, $S_A$, $S_A$ and $S_B$, respectively. It is also possible to substitute different output switches, such as switches $S_C$... $S_N$ for switches $S_A$ and $S_B$, as long as the average current flowing through the resonant circuit during a particular four-pulse format interval is zero, as can be achieved only by connecting opposite polarity output terminals to the resonant circuit during a particular four-pulse sequence. The four-pulse operating format transfers charge from shuttle capacitor 21 in two separate half sinusoidal current pulses over one half of the total four-pulse sequence.

FIG. 4 shows current and voltage waveforms for a situation where output terminals 29 and 31 are respectively maintained at voltages of $+E$ and $-E/2$, and the switches have been operated in such a way that the voltage $V_{YZ}$ across capacitor 21 at the beginning of interval $T_1$ is $-2E$. The sequence of activating switches $S_1$, $S_2$, $S_A$ and $S_B$ for the stated conditions of the voltages at terminals 29 and 31 is identical to that described in connection with FIGS. 2 and 3.

During interval $T_1$, while switches $S_2$ and $S_A$ are closed, no current flows through resonant circuit 1, for the same reasons described above, in connection with FIG. 3 during interval $T_1$, because the same voltage conditions exist during interval $T_1$ for the FIG. 4 assumption as exist during interval $T_1$ during the FIG. 3 situation. Similarly, during interval $T_2$, FIG. 4, during which switches $S_1$ and $S_A$ are closed, the current and voltage variations are identical to the current and voltage variations during interval $T_2$, FIG. 3. Thus, at the conclusion of interval $T_2$, the voltage across capacitor 21 has a level of $+2E$ volts, which can not change instantaneously and exists across the capacitor at the beginning of interval $T_3$.

The voltage $V_{XY}$ across inductor 19 at the beginning of interval $T_3$, while switches $S_1$ and $S_B$ are closed, is equal to $-E/2$, with the voltage at terminal Y greater than the voltage at terminal X. Thus, negative half sinusoidal current pulse 49, having a maximum amplitude of $-I/2$, flows through resonant circuit 1 between terminals 31 and 7 during interval $T_3$. Current pulse 49 charges capacitor 21, so that at the end of interval $T_3$ the capacitor voltage $V_{YZ}$ is $+E$; the current pulse has zero magnitude at the beginning and ends of interval $T_3$.

At the beginning of interval $T_4$, while terminal 9 is connected to terminal 31, the voltages across inductor 19 and capacitor 21 are $+3E/2$ and $+E$, respectively. This results in a negative half wave sinusoidal current pulse 51, having a maximum amplitude of $-3/2I$, being supplied by terminal 9 to load terminal 31. During interval $T_4$, the voltage across capacitor 21 decreases from $+E$ to $-2E$, with a half sinusoidal wave shape that is one-quarter cycle out of phase from the current wave shape 51. Current pulse 51 is considered as a power stroke, resulting from capacitor 21 being correctly charged to a voltage of $+E$ during the stabilizing interval $T_3$, during which load 31 and resonant circuit 1 were supplying current to supply terminal 7.

At the conclusion of interval $T_4$, the voltage, and therefore charge, across capacitor 21 is the same as at the beginning of interval $T_1$. This is because the positive current flowing through capacitor 21 during intervals T₁ and T₂ equals the negative current flowing through the capacitor during intervals T₃ and T₄. Thus, stable operation of resonant circuit 1 is provided and terminals 29 and 31 are automatically maintained at the desired voltages of +E and −E/2.

The previous operating examples of the converter circuit of FIG. 1 using the four-pulse format discussed in connection with FIGS. 2, 3 and 4 demonstrate that the converter circuit operated in accordance with the present invention is stable for a range of output conditions ranging from −E to +E, as long as the output terminals are at opposite polarity voltages or at least one terminal is at zero voltage. A similar analysis can be made for a range of output voltages, to show that the four-pulse format provides stable operation of the converter system of FIG. 1 for any set of output voltages where the total difference between the most positive and most negative output voltages is less than or equal to +2E volts, where 2E is the voltage difference supplied to terminals 7 and 9. The four-pulse format thus provides stable operation of the converter system if the voltage difference between any two output voltage terminals of the converter is never greater than 2E volts.

FIG. 5 of the drawing shows a resonant converter system for inverting DC power derived from positive and negative DC sources 53 and 55 into three-phase voltages developed across balanced resistive load impedances 57, 59 and 61, respectively connected in a wye configuration to terminals 29, 31 and 33. D.C. sources 53 and 55 are connected to terminals 29, 31 and 33 by a circuit including switches $S_1$, $S_2$, $S_A$, $S_B$ and $S_C$, as well as resonant link 1, comprising series inductor 19 and capacitor 21. Output terminals 29, 31 and 33 are respectively shunted to the grounded mid point of input sources by capacitors 35, 37 and 39. Because all of the components between sources 53 and 55 and output terminals 29, 31 and 33 have been described, no further description is necessary.

To enable a three-phase voltage to be developed across load impedances 57, 59 and 61, switches $S_1$, $S_2$, $S_A$, $S_B$ and $S_C$ are operated by control circuitry (described below). To describe the operation in FIG. 5, it is assumed that the voltages across output terminals 29, 31 and 33 are represented as indicated in FIG. 6 at time t=W, where the voltages at terminals 29, 31 and 33 are respectively +E, −E/2 and −E/2. The voltages at terminals 29, 31 and 33 are controlled by the operation of switches $S_1$, $S_2$, $S_A$, $S_B$ and $S_C$, so that they respectively vary in a sinusoidal manner as indicated by waveforms $V_A$, $V_B$ and $V_C$. Waveforms $V_A$, $V_B$ and $V_C$ are phase displaced from each other by 120° and typically have a relatively low frequency, such as 60 Hertz, relative to the resonant frequency of link 1, typically 5 to 20 kiloHertz. Approximately 100 charging and discharging cycles of resonant circuit 1 occur for each cycle of the three-phase output in the FIG. 5 system.

Figure 7:
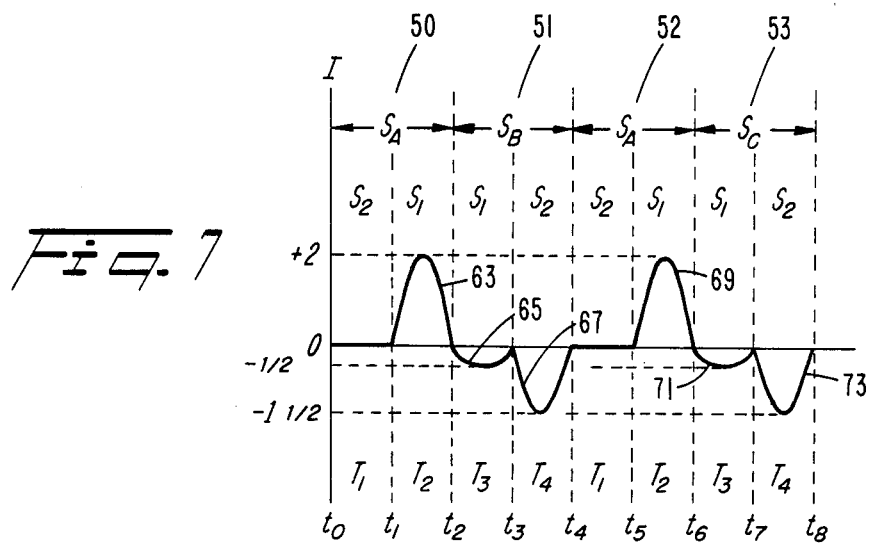
FIG. 7 shows a current pulse pattern produced in the resonant converter circuit of FIG. 5, when operated with the four-pulse format, at a time when one load terminal is substantially at a positive peak value and the other two load terminals are at a minus one half value of the peak voltage.

For the situation illustrated in FIG. 6, switches $S_1$, $S_2$, $S_A$, $S_B$ and $S_C$ are activated to produce the resonant current waveforms illustrated in FIG. 7. The waveforms of FIG. 7 are divided into four periods 50, 51, 52 and 53, each of which is divided into two intervals. During periods 50 and 52 switch $S_A$ is activated to add charge to capacitor 35 and maintain the voltage across capacitor 35 at a +E level. During periods 51 and 53, switches $S_B$ and $S_C$ are respectively activated to maintain the voltages across capacitors 37 and 39 at the −E/2 level. To these ends, during periods 50 and 52 switches $S_1$, $S_2$ and $S_A$ are activated as described above in connection with the first two intervals for the situation illustrated in connection with FIG. 3, i.e., supplying +E volts to terminal 29. During period 51, switches $S_1$, $S_2$ and $S_B$ are activated as described in connection with the third and fourth intervals of FIG. 4, during which a voltage of −E/2 is maintained at terminal 31. During period 53, switches $S_1$, $S_2$ and $S_C$ are activated as indicated during the third and fourth intervals of FIG. 4 to maintain the −E/2 voltage at terminal 33. Thus, periods 50 and 51 together define a four-pulse format having characteristics as discussed in connection with the four-pulse format of FIG. 4. Similarly, periods 52 and 53 together define a four-pulse format as described in connection with FIG. 4.

By operating the converter circuits of FIGS. 1 and 4 in the described manner using the four-pulse format, energy is transferred from DC power supply terminals 7 and 9 to the selected output terminals 29, 31 and 33 every time the voltage across shuttle capacitor 21 reverses polarity by being alternately positively and negatively charged. The alternate positive and negative charges applied to capacitor 21 cause the voltage across the capacitor to alternate between +2E and −2E volts. The total charge transferred to capacitor 21 during any period of converter operation, e.g., period 50, or 51, or 52 or 53, is $\Delta Q = 4EC_s$. In response to charge being taken from or added to the DC voltage sources connected to terminals 7 and 9, there is an energy transfer equal to the product of the charge transferred and the voltage of the source connected between the terminal connected to resonant circuit 1 and ground, as well as the capacitor shunting the load. Accordingly, during each period the absolute value of the energy withdrawn from or added to the DC source connected between terminals 7 or 9 and ground or between one of terminals 29, 31 or 33 and ground is indicated by: $\Delta \epsilon_{output} = \Delta \epsilon_{source} = C_s(4E)(V_o)$, where $\Delta \epsilon_{output} = \Delta \epsilon_{source}$ (assuming a lossless system) and $V_o$ is the output voltage across one of terminals 29, 31 or 33. Each charge transfer $\Delta Q$ results in a change in the voltage at the output terminal connected to resonant circuit 1 in accordance with:

$$\Delta V = \frac{\Delta Q}{C_{oN}},$$

where $\Delta V$ is the voltage change at the selected output terminal, and $C_{oN}$ is the value of the output capacitor. The peak value of the half-sinusoidal current pulse during each of the intervals, such as the four intervals in FIGS. 2–4, is: $I_p = V_{XY} \times \sqrt{C_s/L_s}$, where $V_{XY}$ is the voltage across the shuttle inductor at the beginning of the half sinusoidal pulse of interest, and $C_s$ and $L_s$ are given above.

Figure 8:
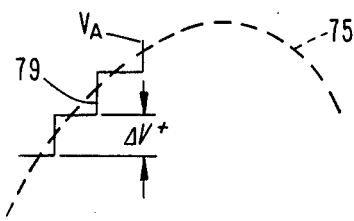
FIG. 8 shows a portion of one phase of the waveform of FIG. 6, illustrating a stepwise build up of that waveform via successive charging of an output capacitor associated with the one phase during successive cycles of operation of the converter circuit of FIG. 5 at time W.
Figure 9:
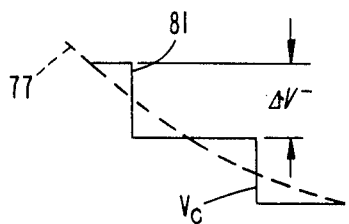
FIG. 9 shows a portion of the waveform of a second phase of the waveform of FIG. 6 at time W, illustrating a stepwise approximation via successive negative charging of the output capacitor associated with the second phase.

Reference is now made to FIGS. 8 and 9 of the drawing, where the variations across capacitors 35 and 39 at times proximate to time W are illustrated. Dash line segments 75 and 77 represent ideal sinusoidal waveforms, while step-like solid line segments 79 and 81 represent step-wise approximations of ideal sinusoids developed across capacitors 35 and 39. In FIG. 8, each of the steps in waveform 79 has a value $\Delta E$ volts, as indicated by $$\Delta V = \frac{\Delta Q}{C_{oN}};$$

where $Q=4C_sE$. Each of the steps in waveform 79 has an equal amplitude because the same charge is transferred to capacitor $C_{oN}$ each cycle. Because FIG. 8 is assumed to be just prior to time W, each of steps 79 is a positive going step. In contrast, each of the steps in FIG. 9 is negative going because waveform $V_C$ is decreasing in amplitude throughout the interval adjacent time W. The magnitude of each of steps $\Delta V$, FIG. 9, is also indicated by $$\Delta V = \frac{\Delta Q}{C_{oN}}.$$

FIG. 10A shows a circuit diagram of a self commutating version of the circuit illustrated in FIG. 5. Bilateral power flow is provided by utilizing parallel, back-to-back silicon controlled rectifiers (SCR) 83, 85, 87, 89, 91, 93, 95, 97 and 101 for switches $S_1$, $S_2$, $S_4$, $S_B$ and $S_C$, forming five bilateral power conducting switches. In particular, silicon controlled rectifiers 83 and 85 are the equivalent to switch $S_1$, silicon controlled rectifiers 87 and 89 are equivalent to switch $S_2$, silicon controlled rectifiers 91 and 93 are equivalent to switch $S_4$, silicon controlled rectifiers 95 and 97 are equivalent to switch $S_B$, and silicon controlled rectifiers 99 and 101 are equivalent to switch $S_C$.

Each pair of back-to-back silicon controlled rectifiers has an individual snubbing circuit. Each snubbing circuit includes a series circuit including a capacitor and resistor in shunt with the anode-cathode paths of the silicon controlled rectifiers being snubbed. In addition, each dual SCR switch has an inductance in the series path. The distributed inductance formed by distributing the shuttle inductance amongst the five silicon controlled rectifier switches, whereby a separate inductor 107 is connected in series with each pair of parallel silicon controlled rectifiers forming a switch. Each of inductors 107 has a value equal to one half of the inductance of inductor 19. Thus, in response to a pair of switches in the input and output circuits being closed, a total series inductance of $L_s$ is provided by the individual snubbing inductors 107. The use of multiple inductors, where each switch has its own inductor, reduces the maximum rate of current change in the SCR to a predetermined value that can be accommodated by the SCRs.

Silicon controlled rectifiers 83-101 are operated in the normal manner in response to gate voltages applied to the control electrodes by controller 109, which can either be a programmed microprocessor or hard wired digital logic circuit, as described below. The silicon controlled rectifiers are self commutating as a consequence of the resonant circuit ($L_sC_s$), where the current goes to zero, and because the anode-cathode paths are cut-off only in response to the anode voltage dropping below the cathode voltage after the silicon controlled rectifiers have been activated into a conducting state by applying positive pulses to gate electrodes. Controller 109 includes individual output terminals for gate electrodes 2, 4, 6 and 8 of silicon controlled rectifiers 83, 85, 87 and 89, respectively in the input circuit. The gate electrodes for the pairs of silicon controlled rectifiers in each of the inverter output circuits are driven in parallel by pulses developed by controller 109, where gating pulses are simultaneously applied to gate electrodes 10 and 12 of SCR's 91 and 93; gate pulses are simultaneously applied to gate electrodes 14 and 16 of silicon controlled rectifiers 95 and 97; and gating pulses are simultaneously applied to gate electrodes 18 and 20 of silicon controlled rectifiers 99 and 101.

Controller 109 is responsive to a speed, i.e., output frequency, control signal applied to terminal 113 and to an output voltage amplitude control signal applied to terminal 111. In response to the signals at terminals 111 and 113, controller 109 derives three reference phases for reference (set point) values for the voltages at terminals 29, 31, and 33. Controller 109 also responds to the actual values of the voltages at terminals 29, 31 and 33. Controller 109 compares the reference three-phase voltages developed with the actual, measured values of the voltages at terminals 29, 31 and 33 to develop control voltages for activating silicon controlled rectifiers 83-101 to achieve the four-pulse format broadly described in connection with FIG. 7. For example, if the converter of FIG. 10A is employed for driving a three-phase AC motor, the motor output speed is controlled by providing constant volt per Hertz three-phase output signals over a desired range via appropriate control of the levels of the output frequency and voltage amplitude control signals at terminals 111 and 113.

Certain changes can be made in the form of semiconductor switches in the circuit of FIG. 10A. For example, silicon controlled rectifiers 83 and 85 or silicon controlled rectifiers 87 and 89 in the input circuit of FIG. 10A can be replaced by the combination of silicon controlled rectifier 40 shunted in a back-to-back relationship by diode 42, as illustrated in FIG. 10B. The self commutating arrangement of each of the switches in FIG. 10A can be replaced by a self commutating circuit including two parallel branches, each of which includes a series diode and transistor emitter collector path, as illustrated in FIG. 10C. In particular, the cathode of diode 43 is connected to the collector of transistor 44, while the cathode of diode 45 is connected to the collector of transistor 46. The emitters of transistors 44 and 46 are respectively connected to the anodes of diodes 43 and 45 to form the two parallel anodes of diodes 43 and 45 to form the two parallel circuits. Blocking diodes 43 and 45 increase the reverse breakdown capability of transistors 44 and 46, respectively.

Figure 11:
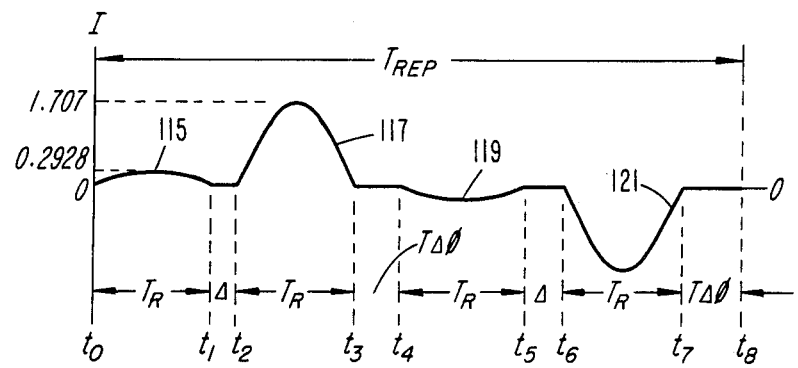
FIG. 11 shows typical current pulse waveforms through the shuttle capacitor during one cycle of operation of the resonant circuit converter of FIG. 10.

Consideration is now given to the operation of the circuit of FIG. 10A in the situation where output terminals 29 and 31 are respectively maintained at equal and opposite voltages of $+0.707E$ and $-0.707E$ by referring to FIG. 11. As illustrated in FIG. 11, the four-pulse format includes positive half wave sinusoidal current pulses 115 and 117 which subsist during intervals $t_0-t_1$ and $t_2-t_3$; current pulse 117 is followed by current pulses 119 and 120 which subsist during intervals $t_4-t_5$ and $t_6-t_7$. Current pulses 115 and 119 have maximum amplitudes of $+0.2928I$ and $-0.2928I$, while current pulses 117 and 121 have maximum amplitudes of $+1.707I$ and $-1.707I$. The total charge transferred by each pair of half sinusoidal current pulses, i.e., in current pulses 115 and 117 and in current pulses 119 and 121, is constant and is equal to the total charge transferred by a single sinousoidal pulse of amplitude $2I$.

Current pulses 115 and 117 are supplied to terminal 29 in response to forward bias being applied simultaneously to gate electrodes 10 and 12 of SCR's 91 and 93 by controller 109. During current pulse 115, a forward bias is supplied by controller 109 to control electrode 8 of SCR 89, where current flows from terminal 9 to terminal 29, in a manner described above in connection with FIG. 2 during the interval associated with half sinusoidal current pulse 35. At the completion of current pulse 115, silicon controlled rectifier 89 is back biased because the current flowing through the anode-cathode path thereof drops to zero. Between the end of current pulse 115 and the beginning of current pulse 117 there subsists an interval $\Delta$, at the end of which forward bias is applied to gate electrode 2 of SCR 83 by controller 109. Interval $\Delta$ assures cut off of silicon controlled rectifier 89 prior to silicon controlled rectifier 83 being fired. During interval $t_2$–$t_3$ while current pulse 117 is being derived, silicon controlled rectifiers 91 and 93 are forward biased by the output of controller 109, whereby current flows from terminal 7 to terminal 29. At the completion of current pulse 117, at time $t_3$, silicon controlled rectifiers 83, 85, 91 and 93 are back biased because the current flowing through them drops to zero and the gate electrodes thereof are not forward biased.

The converter of FIG. 10A remains in this quiescent state for an interval $T\Delta\phi$, to ensure that SCRs 83 and 91 have recovered to the off state, until time $t_4$ when a forward bias is applied to gate electrode 4 of silicon controlled rectifier 85 by controller 109, simultaneously with the controller supplying forward bias to gate electrodes 14 and 16 of silicon controlled rectifiers 95 and 97. Thus, a path is provided between terminals 31 and 7, causing current pulse 119 to be coupled from load terminal 31 to power supply terminal 7. Upon completion of current pulse 119, at time $t_5$, silicon controlled rectifiers 85, 95 and 97 are back biased because current is no longer flowing in them and the forward bias voltages are removed from the gate electrodes thereof. Another interval $\Delta$ subsists between the end of current pulse 119 and the beginning of current pulse 121, at which time controller 109 again applies firing voltages to electrodes 14 and 16 and to gate electrode 6 of SCR 87. Thus, current pulse 121 flows to terminal 9 from output terminal 31 until the current pulse returns to zero, at time $t_7$. At time $t_7$ all of the silicon controlled rectifiers of the inverter of FIG. 10A are back biased and no current flows in the inverter. The inverter remains in the zero current state for an internal $T\Delta\phi$, equal to the same interval between times $t_3$ and $t_4$, until the next four-pulse format begins at time $t_8$.

Self commutation, for silicon controlled rectifiers 83–101 is an important achievement by the use of resonant transfer because added high power commutation circuits are not required.

Figure 13:
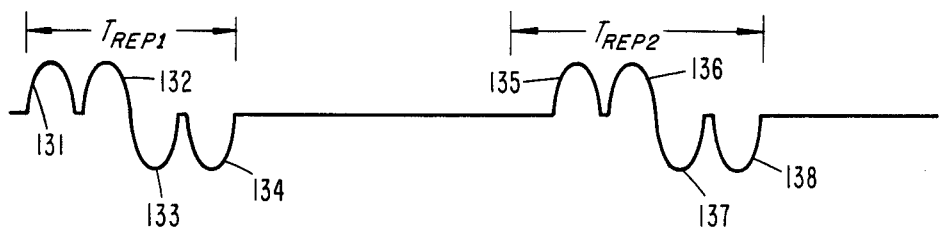

The complete four-pulse format illustrated in FIG. 13 occurs over a duration of $T_{REP}$, which can be represented as $4T_R + 2T\Delta\phi + 2\Delta$, where $T_R$ is the duration of each half sinusoidal pulse and is in turn equal to $T_R = \pi\sqrt{L_s C_s}$. A typical duration for each half sinusoidal current pulse is forty microseconds, while the period $\Delta$ between times $t_1$ and $t_2$, as well as between times $t_5$ and $t_6$, is one microsecond; a typical half cycle dead time ($T\Delta\phi$) is nineteen microseconds. Using these examples, the cycle time $T_{REP}$ of the converter is 200 microseconds, equivalent to a frequency $f_{REP}$ of 5 kiloHertz, where in one 60 Hertz cycle there are 83.3 $T_{REP}$'s. A typical value for the product $L_s C_s$ is $1.62 \times 10^{-10}$ (seconds)$^2$.

For the complete cycle $T_0$–$T_8$, FIG. 11, the voltage across shuttle capacitor 21 reverses twice from 2E volts in one direction to 2E volts in the opposite direction. Over each period $T_{REP}$, the absolute change in voltage level across shuttle capacitor 21 is 8E volts. The total charge transferred by the series resonant circuit between input power terminals 7 and 9 and the selected pair of output terminals from among output terminals 29, 31 and 33 during interval $T_{REP}$ is: $\Delta Q_T = 8 C_s E$. During $T_{REP}$, a charge of up to $4C_s E$ can be transferred to the selected output terminal having a positive output voltage and a charge of up to $4C_s E$ can be transferred to the output terminal having a negative output signal during $T_{REP}$. Accordingly, the selected output terminals during $T_{REP}$ can be supplied with a maximum load current of:

$$I_{MAX} = \Delta \frac{Q_T}{2T_{REP}}.$$

For example, for a converter deriving two oppositely phased 460 volt (RMS) AC voltages powered by DC voltages at terminals 7 and 9 of $\pm 325$ volts, $I_{MAX} = 6.5 \times 10^6 C_s$ amperes.

For a three-phase 460 volt converter system, the RMS value for the currents available at each of output terminals 29, 31 and 33 is:

$$I_{rms} = \frac{2 I_{MAX}}{3\sqrt{2}}.$$

For the previously given typical values, $I_{rms} = 3.0 \times 10^6 \times C_s$ amperes; for a 30 ampere three-phase system, $C_s$ and $L_s$ are respectively equal to 10 microfarads and 16 microhenries. The peak current $I_p$ for these exemplary values is 514 amperes. For the stated three-phase example, the output voltage from each of output terminals 29, 31 and 33 to neutral is 230 volts RMS, and an output power of 20.7 kilowatts can be developed, assuming a lossless, i.e., 100% efficient, converter.

In summation, the present converter system, in the preferred embodiment, uses a four pulse format switching pattern for operating input and output switches to excite series resonant circuit 1 by switching one end of the resonant circuit between equal and opposite DC voltage sources at terminals 7 and 9. The other end of series resonant circuit 1 is switched between different ones of plural load terminals 29, 31, 33 . . . 35, each shunted by a capacitor having a typical value about ten times greater than capacitor 21 of the series resonant circuit. The combination enables half sinusoidal current pulses to flow between the shunt capacitors and the opposite polarity DC voltage sources by way of the series resonant circuit.

A.C. voltages are generated at the output terminals by controlling the rate of charge flow to and from the output capacitors at given times and by charging and discharging the output capacitors to desired levels and polarity at any given time. By charging and discharging the output capacitors in a pseudo sinusoidal manner, sinusoidal i.e., alternating, output voltages are developed across the output capacitors and the load connected to them. The rate and amplitude of the charge coupled between the output capacitors and the DC power supply terminals and the resonant circuit can be varied to provide a variable frequency, variable voltage converter. A conventional 60 Hertz AC synchronous motor can be driven over a wide speed range by controlling the converter so it has a constant volts per Hertz output. Also, two or more of the plural output terminals of the converter can derive a single or multiphase AC output voltage at any desired power level within the constraints imposed on available components for the converter.

Resonant, i.e., shuttle, capacitor 21 provides DC isolation between the DC power supply terminals 7 and 9 and the load connected to output terminals 29, 31 and 33. The half sinusoidal current pulses have magnitudes that are always zero at the time the input and output switches are activated, to provide self commutation for silicon controlled rectifiers 83–101. The maximum current magnitude that the components of the converter system must handle is determined by the relatively low values of the inductance and capacitance of the shuttle inductor and shuttle capacitor of resonant circuit 1.

Because of the symmetrical configuration of the present converter system, balanced DC power supply terminals 7 and 9 are used and balanced output voltages can be derived. The converter of the present invention, in addition to being utilized for DC to AC conversion, can be utilized for AC to AC conversion, and AC to DC conversion. For AC to AC conversion, a rectifier is used to convert the AC input voltage to equal and opposite DC voltages. For AC to DC conversion, AC input voltages are converted to balanced (i.e., equal load) DC voltages at terminals 7 and 9, and DC voltages are developed at terminals 29, 31 and 33. Current flow through the converter system is bi-directional, enabling control of regenerative current from a load (such as an AC motor) connected to output terminals 29, 31 and 33.

Because the converter system of the present invention includes series resonant circuit 1 that is switched at a high frequency relative to the typical 60 Hertz AC voltage supply available in the United States, the resonant circuit link components are relatively small compared to converter systems operated at low, power line frequencies. Typically, the resonant frequency of circuit 1 is 20 kilohertz, although the resonant frequency can be higher or lower, depending upon the components utilized and the inverter application.

To synthesize a desired wave shape, such as a three-phase sinusoid, reference voltages for the desired wave shape and the output voltages are compared to the output voltages to derive error signals to control the timing of the half sinusoidal pulses coupled by the resonant circuit between the input and output terminals. The spacing between pairs of half sinusoidal pulses controls the voltage across the output terminals so that the controlled voltge conforms with the reference voltage. Two possible methods of operating switches $S_1$, $S_2$, $S_A$, $S_B$, and $S_C$ are illustrated in FIGS. 12 and 13.

Figure 12:
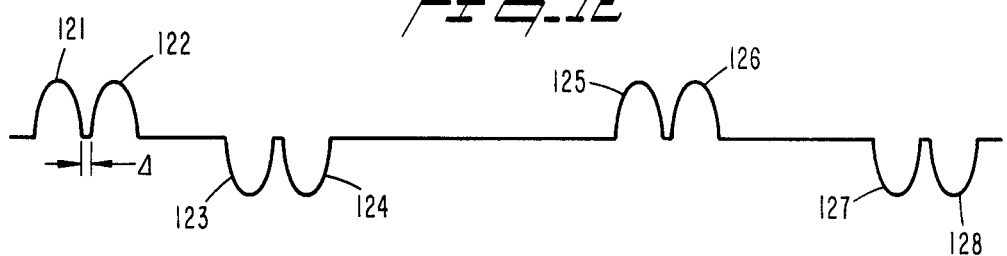
FIGS. 12 and 13 are respectively illustrations of 20 and 5 kiloHertz resonant current waveforms developed during operation of the converter of FIG. 10 using the four-pulse format.

In accordance with the operating mode of FIG. 12, a pair of like, first polarity half sinusoidal current pulses are derived with a time separation of $\Delta$ between them and a pair of like, second polarity half sinusoidal current pulses are derived at a variable time position subsequent to the first named pair of half sinsuoidal current pulses. The first and second pairs of pulses are supplied to opposite polarity output terminals. The time spacing between the first and second pairs of half sinsusoidal current pulses is determined by the error voltages. The selection of switches in the inverter is also determined by the magnitude of the error signals for the different output terminals being supplied. In FIG. 12 positive half sinsusoidal current power pulse 122 is derived substantially immediately after positive half sinsuoidal current pulse 121. For the situation illustrated in connection with FIG. 10, current pulses 121 and 122 are supplied to positive output terminal 29. At a variable time after the completion of current pulse 122, negative half sinusoidal current pulse 123 is derived. The time separation between the end of current pulse 122 and the beginning of current pulse 123 is determined by the amplitudes of the voltages at terminals 31 or 33 relative to the reference levels therefor. Substantially immediately after completion of half sinusoidal current pulse 123, negative half sinusoidal current pulse 124 is supplied to the same output terminal which received current pulse 123.

At a variable time after completion of negative half sinusoidal current pulse 124, positive half sinusoidal current pulses 125 and 126 are derived and supplied to positive output terminal 29. The time interval between the end of current pulse 124 and the beginning of current pulse 125 is determined by the relative amplitude of the actual value across terminal 29 and the desired, reference value therefor. At a variable time after completion of current pulse 126, negative current pulses 127 and 128 are derived and supplied to the negative output terminal having a voltage that deviates from the desired value therefor by the greatest amount. For the situation illustrated in connection with FIG. 6, the negative terminal which would receive current pulses 127 and 128 is opposite from the negative terminal responsive to current pulses 123 and 124. However, in other situations wherein the current required for a particular phase is relatively low, current pulses 123 and 124 can be supplied to the same negative terminal as negative current pulses 127 and 128. Also, an unbalanced load may require the same output terminal to be responsive to adjacent pairs of current pulses having the same polarity. In any event, adjacent pairs of current pulses of one polarity are always separated by adjacent pairs of current pulses of the opposite polarity; for the situation illustrated in FIG. 12, current pulses 123, 124 and 127, 128 are separated by current pulses 125 and 126.

Controller 109 can also activate switches 15, 17, 23, 25 and 27 to enable current pulses having a configuration as illustrated in FIG. 13 to be derived. In particular, switches 15, 17, 23, 25 and 27 are activated so that four half wave sinusoidal pulses are derived during successive cycles $T_{REP1}$ and $T_{REP2}$. Cycle $T_{REP1}$ includes positive current pulses 131 and 132, followed by negative current pulses 133 and 134, while cycle $T_{REP2}$ includes positive current pulses 135 and 136, followed by negative current pulses 137 and 138. The spacing between the four-pulses in cycles $T_{REP1}$ and $T_{REP2}$ is as indicated above in connection with FIG. 11. The interval between cycles $T_{REP1}$ and $T_{REP2}$ is determined by the error signals between the actual voltages at output terminals 29, 31 and 33 relative to the reference values.

In FIG. 6 at time $T_1$, positive current pulses 131, 132, 135 and 136 are supplied to load terminal 29, while negative current pulses 133 and 134 are supplied to terminal 31 and current pulses 137 and 138 are supplied to load terminal 33. There are, however, other instances in time wherein a particular load terminal may require significantly more current than another load terminal of like polarity. In such an instance, the four positive current pulses of two adjacent four-pulse format cycles are supplied to the same terminal and the four negative current pulses of the same two adjacent four-pulse format cycles are supplied to the same negative output terminal.

The control philosophy for one sinusoidal cycle of the voltage developed across one of the output terminals is described in connection with FIG. 14, assuming that a 60 Hertz sinusoidal voltage is developed across load terminal 29. The desired shape of the 60 Hertz sinusoidal wave developed across load terminal 29 is illustrated by sine wave 141, also designated as $V_{REFA}$. The positive half cycle of sine wave 141 is bounded by sinusoidal waves 142 and 143 (also designated as LP and MP, respectively), having amplitudes respectively below and above wave 141. The negative half cycle of sinusoidal wave 141 is bounded by sinusoidal waves 144 and 145 (also respectively designated as LN and MN), having absolute values less than and greater than wave 144.

An error band $\alpha$ subsists between waves 142 and 143, as well as between waves 144 and 145. Any error between the actual voltage across terminal 29 and the reference voltage within error band $\alpha$ is considered to be sufficiently small as to require no correction.

A voltage at terminal 29 less than wave 142, while reference wave 141 is in the positive half cycle, results in charge being applied from the DC power supply terminals 7 and 9 via the resonant circuit 1 to output terminal 29; thereby, the area below curve 142 and above the zero axis is referred to as a generative region. When the voltage at terminal 29 causes the system to be in the generative region, first and second positive current pulses are respectively coupled between input terminals 7 and 9 and output terminal 29. The first positive current pulse is coupled between negative input terminal 9 and output terminal 29 via SCR's 89 and 91 to set the charge on capacitor 21 to an appropriate level for the second positive current pulse. During the second positive current pulse, power is supplied from positive power supply terminal 7 to output terminal 29 via SCR's 83 and 91.

In the event that the voltage across terminal 29 is greater than positive limit wave 143 while reference wave 141 is in a positive half cycle, an indication is provided that the system is to operate in a regenerative mode and power must be supplied by load terminal 29 to power supply terminals 7 and 9. To these ends, two negative current pulses are supplied between terminals 7, 9 and 29. During the first current pulse, the charge on capacitor 21 is set appropriately by supplying a current pulse from load terminal 29 to power supply terminal 7 by way of SCR's 93 and 85. Then, during the second pulse, the voltage on terminal 29 is reduced toward maximum level 143 in response to current flowing from output terminal 29 to negative power supply terminal 9 by way of SCR's 87 and 93.

While reference wave 141 has a negative value and the voltage across terminal 29 is less in absolute magnitude than the level of wave 144, the inverter functions in a generative mode. If, however, the absolute magnitude of the negative voltage at terminal 29 is greater than the absolute magnitude of wave 145, the system operates in a regenerative mode, where energy is supplied by load terminal 29 to power supply terminals 7 and 9.

With the system operating in the generative mode while reference wave 141 has a negative value, i.e., in the region between the zero value and wave 144, where a negative voltage is at terminal 29, the first current pulse sets the charge on capacitor 21 by supplying a first half sinusoidal current pulse from terminal 29 to positive power supply terminal 7 by way of silicon controlled rectifiers 85 and 93. Thereafter, a second current pulse supplies current from terminal 29 to terminal 9 by way of silicon controlled rectifiers 87 and 93.

If, however, the absolute magnitude of the negative voltage at terminal 29 is greater than wave 145 while reference wave 141 has a negative value, regenerative operation occurs. The first current pulse is provided by connecting terminals 9 and 29 together by way of silicon controlled rectifiers 89 and 91, to set the charge on capacitor 21 to an appropriate level for a regenerative power pulse. Then the regenerative power pulse is supplied from terminal 7 to terminal 29 by a conducting path including silicon controlled rectifiers 91 and 83.

It has been found that proper operation is attained if the controller of the present invention is not activated within a predetermined time interval of a zero cross over of reference wave form 141. To these ends, in response to the reference wave for a particular terminal being in the region of the zero cross over, at equal angles of the reference wave on opposite sides of the zero crossing (typical angles being ±20°) the controller inhibits firing signals to that particular terminal.

Figure 15:
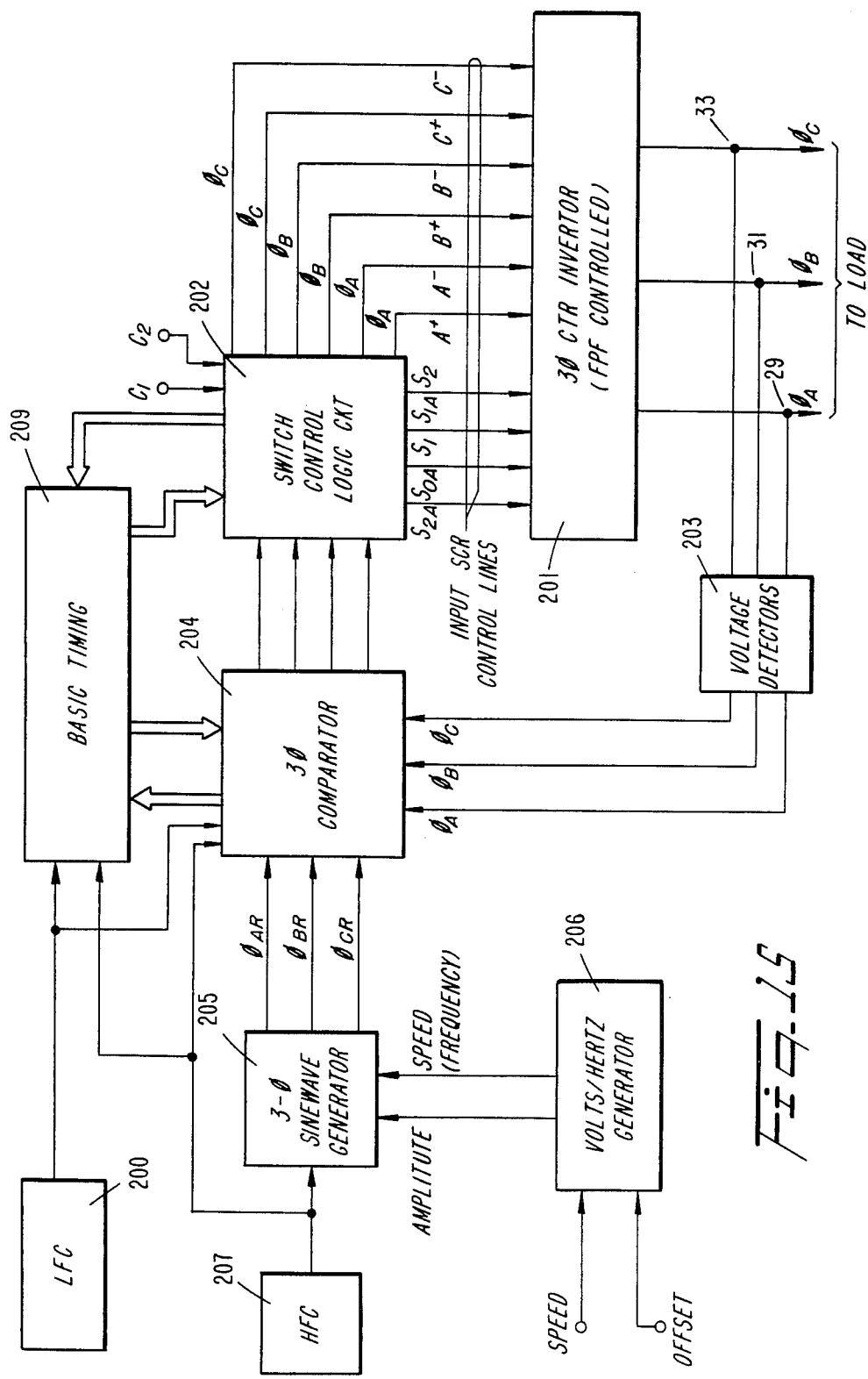
FIG. 15 is an overall block diagram of a control system for an inverter using the present invention.

FIG. 15 shows a block diagram including controller 109 (FIG. 10) and the DC to AC inverter 201 of FIG. 15 employing silicon controlled rectifiers. Inverter 201 is responsive to control signals applied to the gate electrodes of silicon controlled rectifiers 83–101, as derived from switch control logic circuit 202. Silicon controlled rectifiers 83–101 are activated by the output signals of switch control logic circuit 202 to derive three-phase sinusoidal currents which are applied by way of load terminals 29, 31 and 33 to a typical three-phase, generally inductive, load, such as an AC inductance motor. The voltages at load terminals 29, 31 and 33 are monitored by voltage detectors 203, one of which is provided for each of the output terminals. Voltage detectors 203 derive three output voltages, each proportional to the magnitude and indicative of the polarity of the voltages at terminals 29, 31 and 33.

The three output voltages of detectors 203 are applied to three comparators 204, respectively responsive to three reference sinusoidal voltages $\phi_{AR}$, $\phi_{BR}$, and $\phi_{CR}$, for the voltages at the three-phase output terminals 29, 31 and 33. The three-phase references applied to comparator 204 are derived by conventional three-phase sine wave generator 205, in turn responsive to amplitude and frequency control signals derived from conventional volts per hertz generator 206 and high frequency clock pulses (e.g., 100 kiloHertz) derived from source 207. Volts per hertz generator 206 is responsive to operator derived analog control signals indicative of desired speed and off set of the inductance motor being controlled; off set is the finite, non-zero voltage initially applied to the motor for a motor speed of zero. Volts per hertz generator 206 responds to the input signals thereof to derive analog output signals indicative of the amplitude and frequency of the three-phase voltages necessary to achieve the desired speed and off set conditions for the motor. Three-phase sine wave generator 205 responds to the input signals to derive three reference voltages, each displaced from each other by 120°. The amplitude and frequency of the three reference voltages are determined by the signals applied to generator 205 by generator 206. The reference waves derived by generator 205 are in step form, in response to the 100 kHz output of high frequency clock source 207, with each step at the frequency of the clock source.

Comparator 204 responds to the measured voltages at terminals 29, 31 and 33 and the reference voltages derived by sine wave generator 205, as well as clock signals from high frequency clock source 207 and low frequency clock source 208, having a frequency twice the resonant frequency of link 1, (FIG. 1) to derive control signals which are applied to switch control logic circuit 202. Comparator 204 responds to basic timing circuit 209 and supplies control signals to basic timing circuit 209, which is also responsive to the high and low frequency clock signals from sources 207 and 208. Basic timing circuit 209 also supplies timing signals to switch control logic circuit 202, also responsive to signals from clock sources 207 and 208. Switch control logic 202 also supplies control signals to basic timing circuit 209.

Figure 16C:
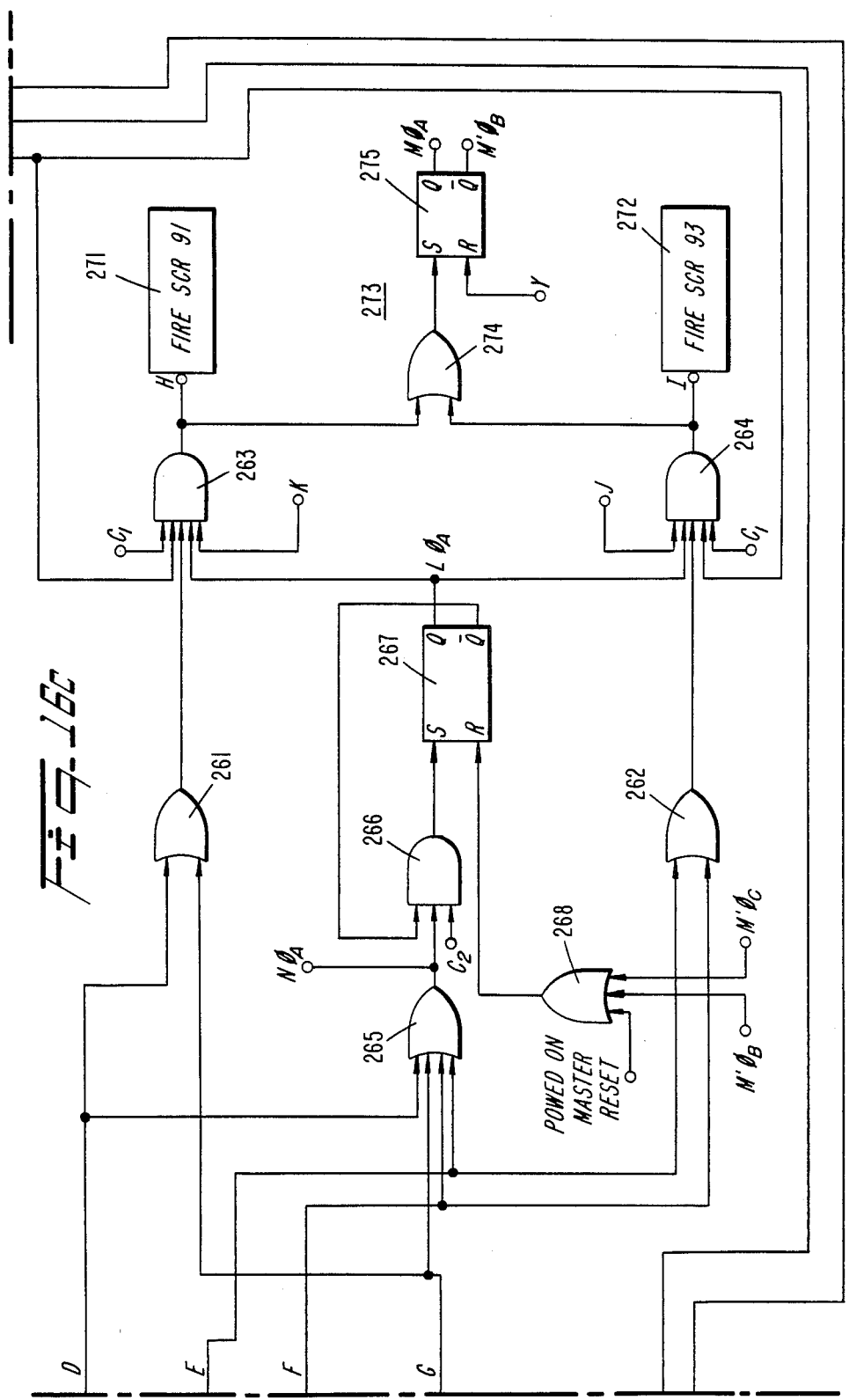
Figure 16D:
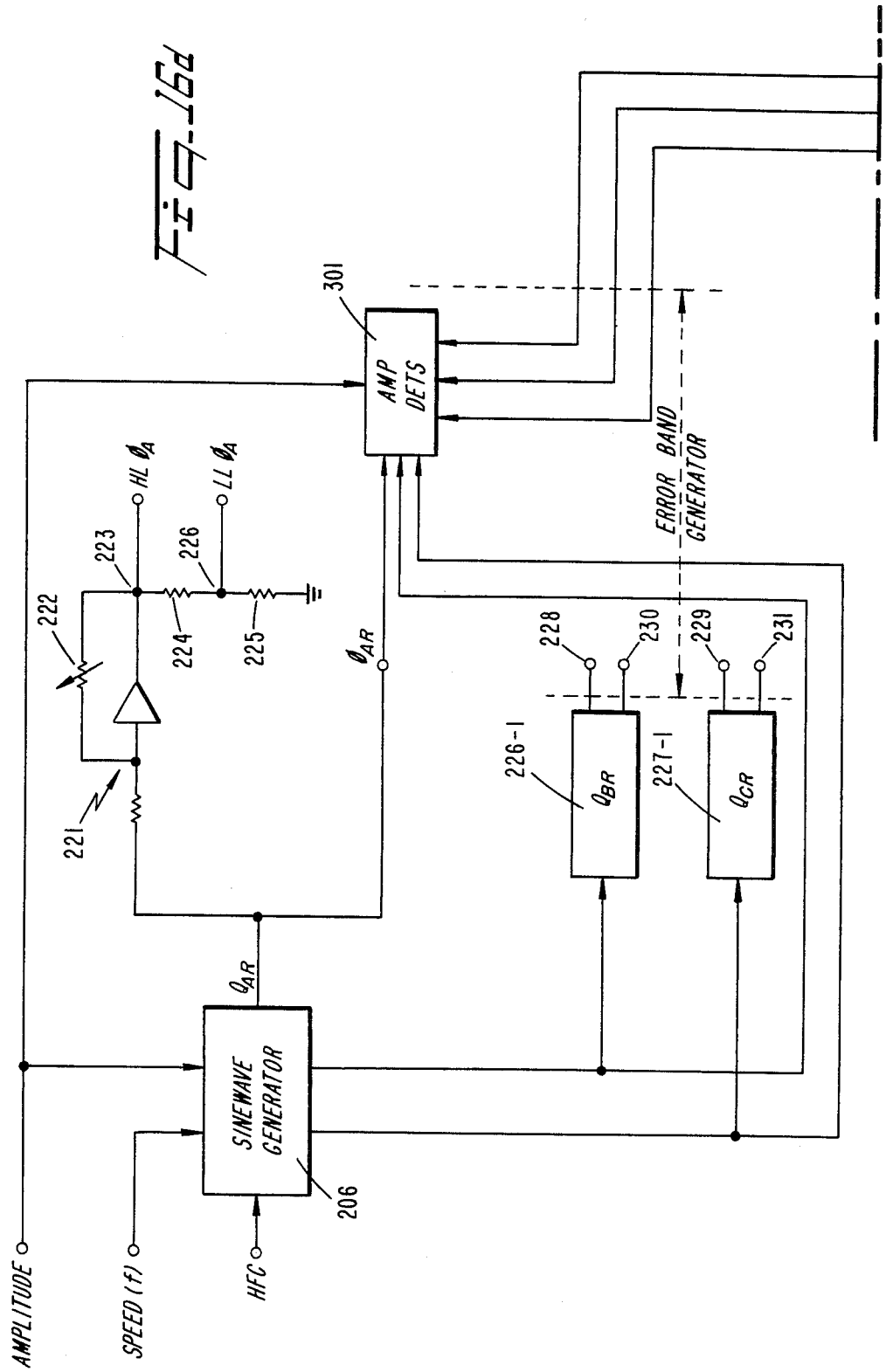

FIG. 16 shows a circuit diagram for switch control logic circuit 202, three-phase comparator 204, and basic timing circuit 209. The logic circuit 213 for control of silicon controlled rectifiers 91 and 93, connected to output terminal 29, is specifically illustrated in FIG. 16. Logic circuits 211 and 212 for control of silicon controlled rectifiers 95 and 97, connected to output terminal 31, and for silicon controlled rectifiers 99 and 101, connected to output terminal 33, are identical to circuit 212. Control circuits 211 and 212 for the silicon controlled rectifiers connected to terminals 31 and 33 are illustrated on FIGS. 16 only by blocks while control circuit 213 is specifically diagrammed.

Figure 14:
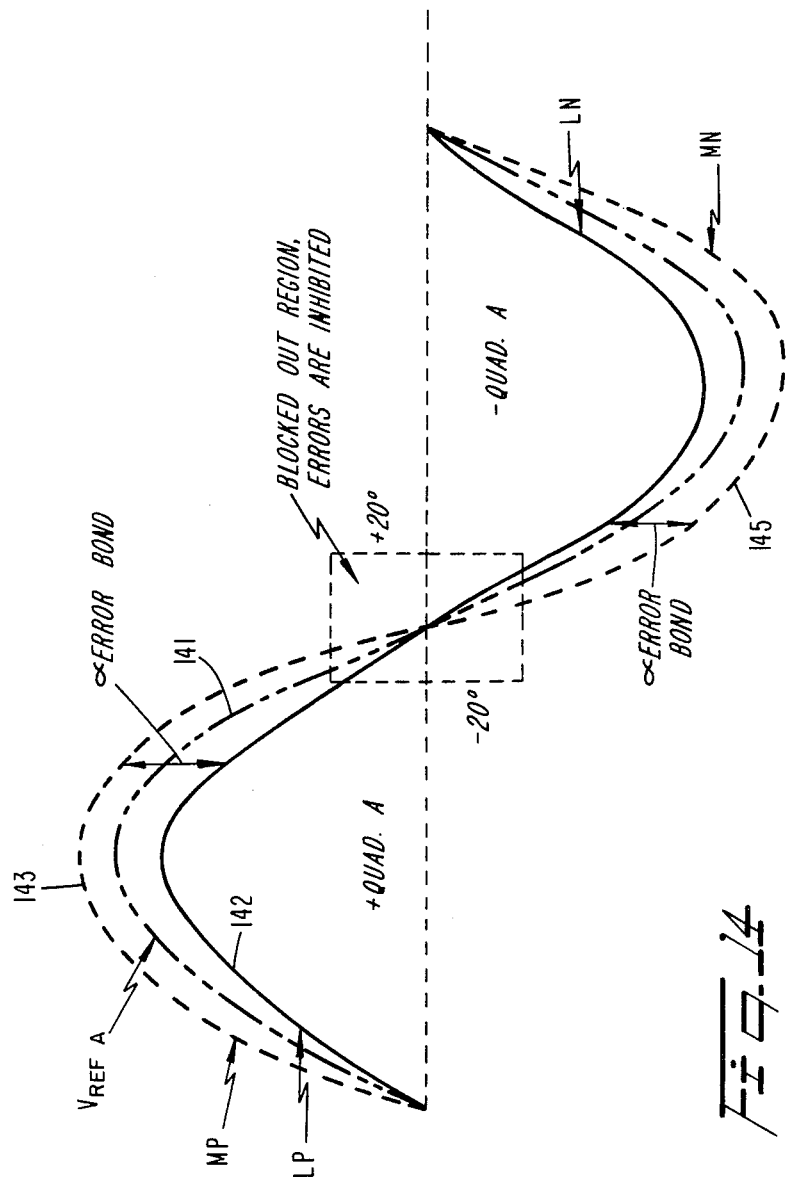
FIG. 14 is a series of sinusoidal waves to assist in describing the operating mode of a control system for an inverter using the present invention.

To derive the limit values, indicated by waves 142–145, FIG. 14, for phase $\phi_A$, associated with output terminal 29, the $\phi_{AR}$ output signal of sine wave generator 205 is supplied to amplifier 221, having a variable feedback, gain adjusting resistor 222 and an output terminal 223, connected to ground by way of tapped resistors 224 and 225. At output terminal 223 and at tap 226 between resistors 224 and 225 are respectively derived sinusoidal limit waves 143, 145, and 142, 144. Variable gain circuits 226.1 and 227.1, similar to circuit 221, are respectively responsive to the reference phase $\phi_{BR}$ and $\phi_{CR}$ output signals of generator 106, which reference phase signals are associated with the signals at output terminals 31 and 33. Variable gain circuits 226.1 and 227.1 are set at the same level as the gain of circuit 221, where the three-phase signals at output terminals 223, 228 and 229 for the high level of the three-phases have the same maximum amplitude and the low reference levels at terminals 226, 230 and 231 have the same maximum AC magnitude. The signals at taps 223 and 226 are applied to controller 213, while the high and low reference waves derived by circuits 226 and 227 are respectively applied to controllers 211 and 212.

Controller 213 includes comparator segment 241 (part of comparator 204) for determining the relationship between the voltage at terminal 29, as indicated by the $\phi_A$ output of voltage detector 203, and the high and low reference levels derived at terminals 223 and 226 for positive and negative values of the $\phi_{AR}$ reference level. In other words, comparator segment 241 determines if positive or negative current pulses are to be applied to terminal 29, for both polarities of reference wave $\phi_{AR}$, as discussed above in connection with FIG. 14.

To these ends, comparator 241 includes six analog comparator amplifiers 242–247, all of which are driven in parallel by the $\phi_A$ output of voltage detectors 203. Comparators 242–247 are of conventional construction, including inverting and non-inverting input terminals and an output terminal on which is derived a bi-level voltage indicative of the relative amplitudes of the voltages applied to the inverting and non-inverting outputs. In particular, binary one and zero levels are derived by amplifiers 242–247 in response to the voltage applied to the inverting input being respectively greater and less than the voltage applied to the non-inverting input of each amplifier.

Six amplifiers 242–247 are included to enable determinations to be made as to the polarity of $\phi_A$, and the magnitude of $\phi_A$ relative to the signals at terminals 223 and 226 for both polarities of $\phi_{AR}$. To determine the polarity of $\phi_A$, $\phi_A$ is applied to the inverting and non-inverting input terminals of amplifiers 243 and 246, respectively; the non-inverting and inverting input terminals of amplifiers 243 and 246 are grounded. Thus, in response to $\phi_A$ being positive and negative, binary one and zero values are respectively derived at the output terminals of amplifiers 243 and 246. To determine that $\phi_A$ is positive, as well as being above the high reference level and below the low reference level, $\phi_A$ is applied to the inverting and non-inverting input terminals of amplifiers 244 and 242, having non-inverting and inverting input terminals respectively responsive to the voltages at taps 223 and 226. To determine that $\phi_A$ is negative and has a magnitude less than $L_n$ and greater than $M_n$, $\phi_A$ is applied to the inverting and non-inverting input terminals of amplifiers 245 and 247 respectively; the inverting and non-inverting input terminals of amplifiers 247 and 245 are respectively connected to be responsive to the $\phi_{AR}$ reference voltages at terminals 223 and 226.

AND gates 251–254 respond to the output signals of amplifiers 242–247, as well as the output of high frequency clock source 207, to derive binary signals indicative of the four conditions indicated in FIG. 14 relative to the high and low references established by waves 142–145. In particular, AND gate 251 derives a binary one level in response to the output signals of amplifiers 242 and 243 to indicate that the voltage at terminal 29 is positive and requires a generative cycle, i.e., two positive current pulses. AND gate 252 responds to the output signals of amplifiers 243 and 244 to derive a binary 1 signal to indicate that the voltage at terminal 29 is positive and requires a regenerative cycle, i.e. two negative current pulses. AND gate 253 responds to the output signals of amplifiers 245 and 246 to derive a binary 1 signal to indicate that the voltage at terminal 29 is negative and requires a generative cycle, i.e., two negative current pulses. AND gate 254 responds to the output signals of amplifiers 246 and 247 to derive a binary 1 signal to indicate that the voltage at terminal 29 is negative and requires a regenerative cycle, i.e., two positive current pulses.

The clocked output signals of gates 251–254 control firing of silicon controlled rectifiers 91 and 93. The clocked output signals of gates 251, 252, 253 and 254 are applied to set input terminals of flip-flops 255, 256, 257 and 258, respectively. Flip-flops 255–258 store the clocked output signals of AND gates 251–254 until the selected one of silicon controlled rectifiers 91 or 93 is fired. To activate silicon controlled rectifier 91 into a fired condition, the Q output terminals of flip-flops 255 and 258 are combined in OR gate 261, while firing of silicon controlled rectifier 93 is provided by supplying the signals at the Q output terminals if flip-flops 256 and 257 to OR gate 262.

The output signals of OR gates 261 and 262 are respectively coupled to input terminals of AND gates 263 and 264, both having additional input terminals responsive to the high frequency clock output signal of source 207. AND gates 263 and 264 are also responsive to complementary output signals of a counter included in basic timing network 209, to assure that only one of AMD gates 263 and 264 is enabled at a particular time and to provide the correct timing for firing of silicon controlled rectifiers 91 and 93.

Phase $\phi_A$ can not be serviced twice in succession, i.e., if phase $\phi_A$ was the most recently serviced phase, phase $\phi_B$ or $\phi_C$ must be serviced before $\phi_A$ can again be serviced. To these ends, the Q output terminals of flip-flops 255–258 are supplied to OR gate 265, having an output that is coupled to one input of AND gate 266 that forms part of a lock out circuit to prevent enabling of AND gates 263 and 264 if two half sinusoidal pulses have not, since the last firing of SCR 91 or 93, been coupled through one of silicon controlled rectifiers 95–101. AND gate 266 responds to the output signal of low frequency clock source 208 and to a signal derived at a $\overline{Q}$ output terminal of flip-flop 267, having a set input terminal responsive to the output of AND gate 266. The reset input of flip-flop 267 is responsive to an output signal of OR gate 268, having input terminals responsive to a master reset signal (derived when power is first applied) and output signals M'$\phi_B$ and M'$\phi_C$, respectively derived from controllers 211 and 212 to indicate that firing of one of silicon controlled rectifiers 95–101 has been completed.

In response to firing of any of silicon controlled rectifiers 95–101 being completed, flip-flop 267 is in a reset state in response to a positive going edge being applied to the reset input of the flip-flop by OR gate 268, having inputs responsive to M'($\phi_B$) and M'($\phi_C$) signals respectively derived from controllers 211 or 212 to indicate that one of SCR's 95–101 has been fired and is extinguished. Initially, flip-flop 267 is reset by a master reset supplied to OR gate 268. The binary 1 input signal from flip-flop 267 to AND gate 266 enables the AND gate to respond to a binary 1 output of OR gate 265 occurring simultaneously with a clock pulse from source 208. This enables firing of silicon controlled rectifiers 91 and 93 after one of silicon controlled rectifiers 95–101 has been extinguished. With flip-flop 267 set, AND gate 266 is disabled so two successive pulses can not be coupled to the set (S) input of flip-flop 267.

Phase $\phi_A$ can be serviced only when the reference phase $\phi_{AR}$ deviates from zero by $\pm 20°$. To these ends, the $\phi_{AR}$ output of reference generator 206 is applied to amplitude detector 301, also responsive to the amplitude input of generator 206. In response to the $\phi_{AR}$ input to detector 301 exceeding an amplitude maximum value determined by the amplitude input of generator 206 and detector 301, the detector derives a binary one output that is coupled in parallel to inputs of AND gates 263 and 264. Thereby, AND gates 263 and 264 can derive binary one outputs in response to the error indicating outputs of OR gates 261 and 262 only when the reference wave $\phi_{AR}$ differs from a zero crossing by $\pm 20°$.

The binary 1 signals derived from AND gates 263 and 264 are respectively applied to circuits 271 and 272, of a well known type for applying forward bias voltage pulses to the gate electrodes of silicon controlled rectifiers 91 and 93. The output signals of AND gates 263 and 264 are also applied to network 273 which indicates that one of silicon controlled rectifiers 91 or 93 has been fired and is in a conducting state. Network 273 includes OR gate 274, having input terminals responsive to the binary signals at the output terminals of AND gates 263 and 264. An output signal of OR gate 274 is applied to a set input terminal of flip-flop 275, having Q and $\overline{Q}$ output terminals on which are respectively derived M($\phi_A$) and M'($\phi_A$) signals having binary one values to indicate that one and neither of silicon controlled rectifiers 91 and 93 is in a conducting state. Flip-flop 275 includes a reset input terminal responsive to a counter of basic timing circuit 209. A binary 1 signal is applied to the reset input terminal of flip-flop 275 by the counter when two half sinusoidal current pulses have been coupled through the forward biased silicon controlled rectifier 91 and 93.

Basic timing circuit 209 includes four flip-flops 281, 282, 283 and 284. Flip-flops 281–283 are toggle or clocked flip-flops having clock (C) and reset (R) input terminals. In response to each pulse supplied to the C input terminal of flip-flops 281–283 the flip-flop changes state. In response to a pulse being applied to the reset (R) input of flip-flops 281–283 the flip-flops are activated into a reset state, whereby binary 1 levels are derived from the $\overline{Q}$ output terminals. Reset pulses are applied to the reset input terminals of flip-flops 281–283 when power is turned on by a master reset source (not shown). Flip-flops 281 and 252 are cascaded with each other so that the Q output terminal of flip-flop 281 is coupled to the clock (C) input terminal of flip-flop 282. The clock (C) input terminal of flip-flop 281 is responsive to pulses from low frequency clock source 208, as selectively coupled through AND gate 286, also responsive to the binary signal at the $\overline{Q}$ output terminal of flip-flop 284. Flip-flop 284 is initially activated into a reset state in response to the master reset pulse, as coupled through OR gate 287 to the reset input of flip-flop 284. Thus, initially AND gate 286 is enabled, so that flip-flops 281 and 282 are toggled in response to the output of low frequency clock source 286.

Flip-flops 283 and 284 are cascaded with each other and are responsive to the low frequency clock pulses from source 208, as selectively coupled through AND gate 286. To these ends, the output of AND gate 286 is supplied to the clock (C) input of flip-flop 283, having a Q output terminal connected to the set (S) input terminal of flip-flop 284. Flip-flop 284 includes a Q output terminal which drives the reset (R) input terminal of flip-flop 275, as well as corresponding terminals of flip-flops in controllers 211 and 212.

Flip-flop 284 is reset by the output of OR gate 287 each time a command is derived by any one of controllers 211, 212 or 213 to fire any of silicon controlled rectifiers 91–101. To these ends, the M($\phi_A$) signal at the Q output terminal of flip-flop 275 is coupled to one input terminal of OR gate 287. M($\phi_B$) and M($\phi_C$) signals from corresponding flip-flop terminals of controllers 211 and 212 are also applied to input terminals of OR gate 287. Each time one of silicon controlled rectifiers 91–101 is fired, flip-flop 284 is reset to enable pulses from low frequency clock source 208 to be coupled to the clock input terminals of flip-flops 281 and 283. After two low frequency pulses have been derived from source 208, commensurate with the time required for servicing a selected output terminal 29, 31 or 33 with two current pulses, flip-flop 284 is again activated to the set state, causing AND gate 286 to be disabled, whereby pulses again are not applied to flip-flops 281 and 283 until another signal has been derived to control firing of one of SCR's 91–101 or until another master reset pulse is derived. Thus, flip-flops 283 and 284 assist in assuring that only one of output terminals 29, 31 or 33 is coupled to resonant circuit 1 at a time and that the selected output terminal is coupled to the resonant circuit for an interval equal to two half sinusoidal pulses of the resonant circuit.

Flip-flops 281 and 282 respond to the low frequency clock pulses from source 208 to control firing of input SCR's 83–89, as well as to assist in controlling firing of SCR's 91–101. The Q and $\overline{Q}$ output terminals of flip-flop 282 assist in controlling firing of SCR's 91 and 93 by being connected to input terminals of AND gates 263 and 264. If the phase associated with output terminal 29 has a sufficient error to be selected, one of AND gates 263 or 264 is enabled for a duration that is twice as long as the interval between adjacent pulses from low frequency clock source 208.

To control enabling of SCR's 83–89 for any selected output terminal 29–31, the signals at the Q and $\overline{Q}$ output terminals of flip-flop 281 and 282 are applied to binary to decimal matrix 293, having four output terminals on which are sequentially derived pulses for enabling firing of silicon controlled rectifiers 89, 83, 85 and 87 in the stated order. Matrix 293 is arranged so that in response to the initial condition of flip-flops 281 and 282, established by the master reset, a binary 1 signal is derived on output lead 294 of the matrix; in response to the condition of flip-flops 281 and 282 after the first pulse from low frequency clock source 208 coupled through gate 286, matrix 293 supplies a binary 1 signal to output lead 295 of the matrix, in response to the condition of flip-flops 281 and 282 after the second low frequency clock pulse has been coupled through gate 286, matrix 293 supplies a binary 1 signal to output lead 296; in response to flip-flops 281 and 282 being set by the third low frequency pulse clock coupled through gate 286, matrix 293 derives a binary 1 level on output lead 297. The binary 1 levels on output leads 294–297 are derived on a mutually exclusive basis so that a binary 1 level subsists on only one of the output leads at a time.

The signals on output leads 294–297 of matrix 293 are respectively applied to AND gates 311–314, each of which is also responsive to a high frequency clock signal from source 207. The output signals of AND gates 311–314 are respectively applied via AND gates 315–318 to firing networks 305–308, respectively provided for input silicon controlled rectifiers 83–89. AND gates 315–318 are driven in parallel by the output of OR gates 319, having an input terminal responsive to the M($\phi_A$) signal at the Q output terminal of flip-flop 275, as well as to M($\phi_B$) and M($\phi_C$) output signals from corresponding flip-flop terminals of controllers 211 and 212. Thus, pulses are derived from AND gates 315–318 in synchronism with pulses from high frequency clock source 297 as a function of the binary levels on leads 294–297, if any one of the SCR's connected to output terminals 29–31 has been commanded to fire. The output signals of AND gates 315–317 are applied to firing circuits 305–308 to control activation of silicon controlled rectifiers 89, 83, 85 and 87, in the named order.

Flip-flops 281 and 282, in combination with matrix 293 and the timing of the M($\phi_A$) and M($\phi_C$) signals supplied to gate 319 assure the correct polarity current pulses through SCR's 83–89. Thus if two positive current pulses are to be applied, flip-flops 281 and 282 respond to pulses from source 208 while gate 319 is enabled to actuate circuits 305 and 306. Circuits 305 and 306 can not be actuated until circuits 307 and 308 have been actuated because of the four state counter formed by flip-flops 281 and 282. Two negative current pulses to a selected output terminal must be derived in response to activating circuits 307 and 308 and prior to circuits 305 and 306 again being activated.

Firing circuits 305–308 include counters responsive to the signals derived by gates 315–318 to provide the required dead time between adjacent current pulses, as described supra in connection with FIG. 11. Because such counting circuits are well known, no further details of firing circuits 305–308 are believed necessary.

If SCR's 83–101 or diodes are employed in the inverter switches and commands are simultaneously derived from two of controllers 211–213 for like polarity power pulses to be supplied to two of output terminals 29–33, the output terminal at the lowest voltage is automatically supplied with current, i.e., no lock out circuit is required for simultaneous commands for like polarity servicing of two output terminals. This is because the anode cathode of the SCR's or diodes connected to the highest voltage output terminal are inherently back biased under such conditions by the lower voltage at the output terminal that actually is to be serviced.

While the invention has been described in connection with a hard wired controller, it is to be understood that a microprocessor based controller can also be employed.

While there has been described and illustrated several specific embodiments of the invention, it will be clear that variations in the details of the embodiments specifically illustrated and described may be made without departing from the true spirit and scope of the invention as defined in the appended claims.

We claim:

1. A method of regulating a load so it has a predetermined voltage, the load being regulated with a resonant circuit selectively connected between the load and a source, the resonant circuit including a series capacitor, the load including a shunt capacitor having a value such that the load voltage remains relatively constant between adjacent exchanges of energy between the resonant circuit and to the load, comprising charging the series capacitor to a level determined by the source voltage and the voltage across the shunt capacitor, and connecting the source in series with the load and the resonant circuit while the series capacitor is charged to said level for an interval equal to one half cycle of the resonant circuit resonant frequency so current flowing between the source and the load via the resonant circuit during the interval is zero at the beginning and end of the interval.

2. The method of claim 1 further including the step of instigating the flow of said current between the source and the load via the resonant circuit at a time determined by the relative amplitudes of the load voltage and the predetermined voltage.

3. The method of claim 1 wherein the series capacitor is charged to the level by a DC voltage source for a period having a duration equal to the interval so that the resonant circuit current is zero at the beginning and end of the period and approximately all of the charge subsisting across the capacitor at the end of the period subsists across the capacitor at the beginning of the interval.

4. The method of claim 3 wherein the DC voltage source for charging the series capacitor during the period has a polarity that is the same as the polarity of the DC source connected to the resonant circuit during the interval.

5. A method of regulating a load so it has a predetermined voltage, the load being regulated with a resonant circuit selectively connected between the load and a source, the resonant circuit including a series capacitor, the load including a shunt capacitor having a value such that the load voltage remains relatively constant between adjacent exchanges of energy between the resonant circuit and the load, comprising connecting the source in series with the resonant circuit and the load for an interval equal to one half cycle of the resonant circuit resonant frequency so current flowing between the source and the load via the resonant circuit during the interval is zero at the beginning and end of the interval, the flow of said current between the source and the resonant circuit to the load being instigated at a time determined by the relative amplitudes of the load voltage and the predetermined voltage.

6. A DC to N phase AC converter, where N is an integer greater than 2, comprising a DC source having first and second terminals for deriving opposite polarity DC voltages, a series resonant circuit, N output terminals, one for each phase of the converter, means for selectively connecting the series resonant circuit in series with the first and second terminals and the N output terminals for an interval equal to one half cycle of the resonant circuit resonant frequency so current flows between a selected one of the first and second terminals and the resonant circuit and a selected one of the N output terminals during the interval, the resonant circuit current being zero at the beginning and end of the interval, a capacitor shunting each of the output terminals, each shunt capacitor having a value relative to the capacitance of the series resonant circuit so that the voltage across each output terminal remains approximately constant between adjacent exchanges of energy between the resonant circuit and the output terminal, means responsive to the actual voltage across each of the N output terminals and a reference voltage for each of the N output terminals for controlling said means for selecting and for controlling the time of instigating the flow of said current between the selected first and second terminals and the selected output terminal via the resonant circuit, the frequency of the AC voltage developed across the N output terminals being much less than the resonant frequency of the resonant circuit.

7. The converter of claim 6 wherein the means for controlling activates the means for selecting so the resonant circuit capacitance is charged, prior to application of energy to the selected output terminal, to a level determined by the voltage across the selected output terminal so that at the beginning of the interval the capacitance is charged to the level.

8. The converter of claim 7 wherein the means for controlling activates the means for selecting to connect the selected output terminal to the source terminal having a polarity opposite to the selected source terminal, the connection subsisting for a period having a duration equal to the interval so that the resonant circuit current is zero at the beginning and end of the period and approximately all of the charge subsisting across the capacitor at the end of the period subsists across the capacitor at the beginning of the interval.

9. The converter of claim 6 wherein the voltages at the first and second terminals have the same magnitude.

10. A DC to AC converter comprising a DC source having first and second terminals for deriving opposite polarity DC voltages, a series resonant circuit, an output terminal across which the AC is developed, means for selectively connecting the series resonant circuit in series with the first and second terminals and the output terminal for an interval equal to one half cycle of the resonant circuit resonant frequency to apply current from a selected one of the first and second terminals and the resonant circuit to the output terminal during the interval so that the resonant circuit current is zero at the beginning and end of the interval, a capacitor shunting each of the output terminal, each shunt capacitor having a value relative to the capacitance of the series resonant circuit so that the voltage across the output terminal remains approximately constant between adjacent exchanges of energy between the resonant circuit and the output terminal, means responsive to the voltage across the output terminal and a value for a reference voltage for the output terminal for controlling said means for selecting and for controlling the time of instigating the flow of said current between the selected first and second terminals and to the selected output terminal via the resonant circuit, the frequency of the AC voltage developed across the N output terminals being much less than the resonant frequency of the resonant circuit.

11. The converter of claim 10 wherein the means for controlling activates the means for selecting so the resonant circuit capacitance is charged, prior to application of energy to the selected output terminal, to a level determined by the voltage across the output terminal so that at the beginning of the interval the capacitance is charged to the level.

12. The converter of claim 10 wherein the means for controlling activates the means for selecting to connect the output terminal to the source terminal having a polarity opposite to the selected source terminal for a period having a duration equal to the interval so that the resonant circuit current is zero at the beginning and end of the period and approximately all of the charge subsisting across the capacitor at the end of the period subsists across the capacitor at the beginning of the interval.

13. Apparatus for converting DC to AC comprising a DC source having equal amplitude and opposite polarity first and second DC terminals, first and second AC output terminals on which are simultaneously derived opposite polarity AC voltages, an output capacitor shunting each of the output terminals, a series resonant circuit, each of the output capacitors having a capacitance much greater than capacitance of the resonant circuit so that voltage established on the output capacitance has a tendency to remain constant over a period equal to many resonant frequency cycles of the resonant circuit, and means for connecting the resonant circuit to the first and second DC terminals and to the first and second output terminals for intervals having equal durations so first and second opposite polarity half sinusoidal power pulses having zero initial and final currents alternately flow relative to the first and second AC output terminals respectively, said connecting means establishing a charge that is a function of the DC source voltage amplitude and the voltage across the output terminal through which the next power pulse flows.

14. The apparatus of claim 13 wherein the means for connecting establishes the charge immediately prior to the first and second power pulses by connecting the second and first DC terminals to the resonant cicuit while the resonant circuit is respectively connected to the first and second output terminals for equal intervals equal to the interval of one of the half sinusoidal pulses.

15. The apparatus of claim 13 further including a reference source for voltages at the output terminals, and means responsive to an error function of the voltages at the output terminals and the reference source for controlling the times when the first and second power pulses are supplied to the first and second terminals.

16. A method of converting DC to AC with a DC source having equal amplitude and opposite polarity first and second DC terminals, first and second AC output terminals on which are simultaneously derived opposite polarity AC voltages, an output capacitor shunting each of the output terminals, a series resonant circuit, each of the output capacitors having a capacitance much greater than capacitance of the resonant circuit so that voltage established on the output capacitance has a tendency to remain constant over a period equal to many resonant frequency cycles of the resonant circuit, the method comprising establishing a first charge on the resonant circuit capacitance that is a function of the DC source voltage amplitude and the voltage of the first output terminal, with the first charge established connecting the resonant circuit to the first DC terminal and first AC output terminal for an interval of one half a resonant frequency cycle of the resonant circuit so a half wave power pulse having zero initial and final currents and of a first polarity is coupled via the resonant circuit between the first DC terminal and the first AC output terminal, establishing a second charge on the resonant circuit capacitance that is a function of the DC source voltage amplitude and the voltage of the second output terminal, with the second charge established connecting the resonant circuit to the second DC terminal and second AC output terminal for an interval of one half a resonant frequency cycle of the resonant circuit so a half wave power pulse having zero initial and final currents and of a second polarity is coupled via the resonant circuit between the second DC terminal and the second AC output terminal.

17. The method of claim 16 wherein the first charge is established by connecting the resonant circuit to the second DC terminal and first AC output terminal for an interval of one half a resonant frequency cycle of the resonant circuit so a half wave charge establishing pulse having zero initial and final currents of the first polarity is coupled via the resonant circuit between the second DC terminal and the first AC output terminal, the second charge being established by connecting the resonant circuit to the first DC terminal and second AC output terminal for an interval of one half a resonant frequency cycle of the resonant circuit so a half wave charge establishing pulse have zero initial and final currents of the second polarity is coupled via the resonant circuit between the first DC terminal and the second AC output terminal.

18. The method of claim 17 further comprising initially charging the capacitance, prior to the first charge establishing pulse, to a voltage equal to twice the amplitude of the DC source, the voltage across the capacitance at the end of the second power pulse having the same amplitude and polarity as the voltage resulting from the initial charging and the voltage across the capacitance at the end of the first power pulse having the same amplitude and polarity opposite from the voltage resulting from the initial charging.

19. The method of claim 16 further including controlling the times when the first and second power pulses are coupled between the input and output terminals in response to an error function of the voltages across the output terminals relative to reference values therefor.

20. The method of claim 19 wherein the polarities of the reference values for the first and second output terminals differ, and controlling the polarity of the first and second power pulses in response to the polarity of the error function.

21. In a DC to AC converter including a series resonant circuit having a shuttle capacitor and a shuttle inductor for providing resonant current flow for charge transfer between DC voltage sources of $+E$ and $-E$ volts and selected ones of a plurality of output capacitors, whereby over successive cycles of operation of said converter said output capacitors are charged and discharged so desired voltage levels are derived across them at any given time, a method of operating said converter so voltage across said shuttle capacitor is naturally stabilized over a cycle of the converter operation, the voltage across the capacitor being reversed in polarity between absolute levels of 2E volts during each half-cycle of said converter by supplying a zero average current to the capacitor over each converter cycle of operation, the method comprising the steps of:

(1) providing a unidirectional current path during a first quarter cycle of the converter operation so resonant current flows between a first one of said $+E$ and $-E$ sources of voltage and a first one of said plurality of output capacitors through said series resonant circuit in a first direction;

(2) providing a unidirection current path during a second quarter cycle of the converter operator so resonant current flows between the or second one of said $+E$ and $-E$ sources of voltage and the first one of said plurality of output capacitors through said series resonant circuit in the first direction;

(3) providing a unidirectional current path during a third quarter cycle of the converter operation so resonant current flows between the first one of said $+E$ and $-E$ sources of voltage and the second one of said plurality of output capacitors through said series resonant circuit in a second direction;

(4) providing a unidirectional current path during a fourth quarter cycle of the converter operation so resonant current flows between the second one of said $+E$ and $-E$ sources of voltage and the second one of said plurality of output capacitors through said series resonant circuit in the second direction; and, repeating steps (1) through (4) to provide a frequency of operation of said converter that is no greater than one-half the resonant frequency of said series resonant circuit.

22. In a DC to AC converter including a series resonant circuit having a shuttle inductor and a shuttle capacitor for resonantly transferring energy between DC voltage sources of $+E$ and $-E$ volts and selected ones of a plurality of output capacitors, whereby over successive cycles of operation of said converter and output capacitors are charged and discharged to obtain desired levels of voltage across each one of said capacitors at any given time to obtain a desired conversion of said $+E$ and $-E$ voltages, said converter including means for naturally stabilizing the voltage across said shuttle capacitor between plus and minus 2E volts at any given time, the voltage polarity across the shuttle capacitor reversing during each half-cycle of said converter via said stabilization means maintaining zero average current flow through said shuttle capacitor over each cycle of operation of said converter, said stabilization means comprising:
  first switching means for providing a unidirectional current path during a first quarter cycle of the converter operation for permitting resonant current to flow between a first one of said +E and −E sources of voltage and a first one of said plurality of output capacitors through said series resonant circuit in a first direction;
  second switching means for providing a unidirectional current path during a second quarter cycle of the converter operation for permitting resonant current to flow between the second one of said +E and −E sources of voltage and the first one of said plurality of output capacitors through said series resonant circuit in the first direction;
  third switching means for providing a unidirectional current path during a third quarter cycle of the converter operation for permitting resonant current to flow between a second one of said plurality of output capacitors and the second one of said +E and −E sources of voltage through said series resonant circuit in a second direction; and
  fourth switching means for providing a unidirectional current path during a fourth quarter cycle of the converter operation for permitting resonant current to flow between the second one of said plurality of output capacitors and the first one of said +E and −E sources of voltage through said series resonant circuit in the second direction.

23. The converter of claim 22 wherein said first switching means includes:
  first unidirectional current switching device means connected between one end of said series resonant circuit and said source of +E volts operable to a first and second conditions in which unidirectional current flows between said source of +E volts and said resonant circuit and for no current flows, respectively;
  second unidirectional current switching device means connected between said one end of said series resonant circuit and said source of −E volts, operable to first and second conditions in which unidirectional current flows between said source of −E volts and said resonant circuit, and no current flows, respectively; and
  a plurality of third unidirectional current switching device means each individually connected between the other end of said series resonant circuit and one end of said plurality of output capacitors, respectively, the other ends of said plurality of output capacitors being connected to a source of reference potential, each of said plurality of third unidirectional current switching device means being individually operable to first and second conditions in which unidirectional current flows between said other end of said series resonant circuit and its respective output capacitor, and no current flows, respectively.

24. The converter of claim 22 wherein said second switching means includes:
  first unidirectional current switching device means connected between one end of said series resonant circuit and said source of +E volts operable to first and second conditions in which unidirectional current flows between said source of +E volts and said resonant circuit and no current flows, respectively;
  second unidirectional current switching device means connected between said one end of said series resonant circuit and said source of −E volts, operable to first and second conditions in which unidirectional current flows between said source of −E volts and said resonant circuit, and no current flows, respectively; and
  a plurality of third unidirectional current switching device means each individually connected between the other end of said series resonant circuit and one end of said plurality of output capacitors, respectively, the other ends of said plurality of output capacitors being connected to a source of reference potential, each of said plurality of third unidirectional current switching device means being individually operable to first and second conditions in which unidirectional current flows between said other end of said series resonant circuit and its respective output capacitor, and no current flows, respectively.

25. The converter of claim 22 wherein said third switching means includes:
  a plurality of first unidirectional current switching device means individually connected between one end of said series resonant circuit and one end of individual ones of said plurality of output capacitors, respectively, the other ends of said output capacitors being connected to a source of reference potential, each of said plurality of first unidirectional current switching device means being individually operable to first and second conditions in which unidirectional current flows between the respective output capacitor and said resonant circuit;
  said unidirectional current switching device means connected between the other end of said series resonant circuit and said source of +E volts operable to first and second conditions in which unidirectional current flows between said series resonant circuit and said source of +E volts and no current flows, respectively; and
  third unidirectional current switching device means connected between the other end of said series resonant circuit and said source of −E volts operable to first and second conditions in which unidirectional current flows between said series resonant circuit and said source of −E volts and no current flows, respectively.

26. The converter of claim 22 wherein said fourth switching means includes:
  a plurality of first unidirectional current switching device means individually connected between one end of said series resonant circuit and one end of individual ones of said plurality of output capacitors, respectively, the other ends of said output capacitors being connected to a source of reference potential, each of said plurality of first unidirectional current switching device means being individually operable to first and second conditions in which unidirectional current flows between the respective output capacitor and said resonant circuit and no current flows, respectively;
  second unidirectional current switching device means connected between the other end of said series resonant circuit and said source of +E volts operable to first and second conditions in which unidirectional current flows between said series resonant circuit and said source of +E volts and no current flows; and third unidirectional current switching device means connected between the other end of said series resonant circuit and said source of −E volts, operable to first and second conditions in which unidirectional current flows between said series resonant circuit and said source of −E volts and no current flows, respectively.

27. The converter of claim 23 wherein each of said first, second and plurality of third unidirectional current switching device means includes a silicon-controlled-rectifier naturally commutated from a conducting to a non-conducting state in response to the magnitude of the resonant current flowing through it dropping substantially to zero.

28. The converter of claim 25 wherein said plurality of first unidirectional current switching device means, and said second and third unidirectional current switching device means each includes a silicon-controlled-rectifier naturally commutated from a conducting to a non-conducting state in response to the magnitude of the resonant current flowing through it dropping substantially to zero.

29. The converter of claim 23 whereby each of said first, second and plurality of third unidirectional current switching device means includes a power switching transistor.

30. The converter of claim 25 wherein each of said plurality of first unidirectional current switching device means, and said second and third unidirectional current switching device means includes a power switching transistor.

31. The converter circuit of claim 22 wherein said first switching means includes:

first unidirectional current switching device means connected between said series resonant circuit and said source of +E volts, operable to a first condition for unidirectionally conducting current from said source of +E volts to said series resonant circuit;

a diode having an anode electrode connected to said source of −E volts and a cathode electrode connected to said series resonant circuit for unidirectionally conducting current from said source of −E volts to said series resonant circuit;

a plurality of second unidirectional current switching device means each individually connected between said series resonant circuit and said plurality of output capacitors, respectively, said plurality of second unidirectional current switching device means each being individually operable to a first condition for unidirectionally conducting current from said series resonant circuit to an output capacitor connected thereto, and each having a second condition for preventing such flow of current.

32. The converter circuit of claim 22 wherein said second switching means includes:

first unidirectional current switching device means connected between said series resonant circuit and said source of +E volts, operable to a first condition for unidirectionally conducting current from said source of +E volts to said series resonant circuit;

a diode having an anode electrode connected to said source of −E volts and a cathode electrode connected to said series resonant circuit for unidirectionally conducting current from said source of −E volts to said series resonant circuit;

a plurality of second unidirectional current switching device means each individually connected between said series resonant circuit and said plurality of output capacitors, respectively, said plurality of second unidirectional current switching device means each being individually operable to a first condition for unidirectionally conducting current from said series resonant circuit to the output capacitor connected thereto, and each having a second condition for preventing such flow of current.

33. The converter circuit of claim 31 wherein said first unidirectional current switching device means includes a silicon-controlled-rectifier having an anode electrode connected to said source of +E volts and a cathode electrode connected to said series resonant circuit.

34. The converter circuit of claim 31 wherein each of said plurality of second unidirectional current device means includes a silicon-controlled-rectifier having an anode electrode connected to said series resonant circuit and a cathode electrode individually connected to said plurality of output capacitors.

35. The converter circuit of claim 31 wherein each of said first unidirectional switching device means and said plurality of second unidirectional current device means includes a power switching transistor.

36. The converter circuit of claim 22 wherein said third switching means includes:

first unidirectional current switching device means connected between said series resonant circuit and said source of −E volts, operable to a first condition for unidirectionally conducting current from said series resonant circuit to said source of −E volts;

a diode having a cathode electrode connected to said source of +E volts and an anode electrode connected to said series resonant circuit for unidirectionally conducting current from said series resonant circuit to said source of +E volts;

a plurality of second unidirectional current switching device means each individually connected between said series resonant circuit and said plurality of output capacitors, respectively, said plurality of second unidirectional current switching device means each being individually operable to a first condition for unidirectionally conducting current from said series resonant circuit to an output capacitor connected thereto, and each having a second condition for preventing such flow of current.

37. The converter circuit of claim 22 wherein said fourth switching means includes:

first unidirectional current switching device means connected between said series resonant circuit and said source of −E volts, operable to a first condition for unidirectionally conducting current from said series resonant circuit to said source of −E volts;

a diode having a cathode electrode connected to said source of +E volts and an anode electrode connected to said series resonant circuit for unidirectionally conducting current from said series resonant circuit to said source of +E volts;

a plurality of second unidirectional current switching device means each individually connected between said series resonant circuit and said plurality of output capacitors, respectively, said plurality of second unidirectional current switching device means each being individually operable to a first condition for unidirectionally conducting current from said series resonant circuit to the output capacitors connected thereto, and each having a second condition for preventing such flow of current.

38. The converter circuit of claim 36 wherein said first unidirectional current switching device means includes a silicon-controlled-rectifier having a cathode electrode connected to said source of −E volts and an anode electrode connected to said series resonant circuit.

39. The converter circuit of claim 36 wherein each of said plurality of second unidirectional current device means includes a silicon-controlled-rectifier having a cathode electrode connected to said other end of said series resonant circuit and an anode electrode individually connected to said plurality of output capacitors.

40. The converter circuit of claim 36 wherein each of said first unidirectional switching device means and said plurality of second unidirectional current device means includes a power switching transistor having a main current path polarized for unidirectional current flow in the desired direction.

41. In a cyclically operated charge transfer regulator converter including a series resonant circuit having a shuttle inductor and a shuttle capacitor, first and second power terminals connected to DC voltage sources having +E and −E output voltages, first and second output terminals connected to a load, a reference terminal connected to a reference potential, first and second output capacitors having first electrodes commonly connected to said reference terminal second electrodes connected to said first and second output terminals respectively, a method of operating said converter for resonantly conducting current between said +E and −E voltage sources and said first and second output terminals whereby current is coupled between a load connected to said output terminals and said sources to obtain a desired level of voltage across the load at any given time, the voltage across the shuttle capacitor reversing polarity during each half-cycle of said converter between absolute levels of 2E volts at the beginning and end of each half-cycle via the maintenance of a zero average magnitude of current flow over each cycle of operation of said converter, such method of operation of said converter over each cycle comprising the steps of:
  (1) providing a unidirectional current path during a first quarter cycle of the converter operation so resonant of a first polarity current flows between a first one of said DC sources of voltage and a first one of said output terminals through said series resonant circuit;
  (2) providing a unidirectional current path during a second quarter cycle of the converter operation so resonant current of the first polarity flows between the other DC source and the first output terminal through said series resonant circuit;
  (3) providing a unidirectional current path during a third quarter cycle of the converter operation so resonant current of a second polarity flows between the second output terminal and the other DC source through said series resonant circuit;
  (4) providing a unidirectional current path during a fourth quarter cycle of the converter operation so resonant current of the second polarity flows between the second output terminal and the first DC source through said series resonant circuit; and
  repeating steps (1) through (4) for providing a frequency of operation of said converter that is substantially less than the resonant frequency of said series resonant circuit, each of said one-quarter cycles having a duration equal to one-half the period of one resonant frequency cycle of the resonant circuit.

42. A cyclically operated charge transfer regulator converter for converting DC to three phase AC, comprising:
  first, second, and third output terminals;
  a reference terminal connected to a reference potential;
  first, second, and third output capacitors each having a first electrode connected to said reference terminal and second electrodes respectively connected to said first, second, and third output terminals;
  first and second power terminals respectively connected to sources of DC voltages having levels of +E and −E volts;
  a series resonant circuit including a shuttle inductor and a shuttle capacitor;
  first and second input switching means respectively having first electrodes connected to said first and second power terminals and second electrodes having a common connection to said resonant circuit, said first and second input switching means each being operable to:
  a first condition for providing a current path for unidirectional current flow of a first polarity between the power terminal associated therewith and said resonant circuit, a second condition for providing a current path for unidirectional current flow of a second polarity between said resonant circuit and the power terminal associated therewith, a third condition for preventing current flow therebetween;
  first, second and third output switching means each having a main current path connected to said resonant circuit, each of said output switching means being respectively connected to said first, second and third output terminals and operable to:
  a first condition for providing a current path for unidirectional current flow of the second polarity between said resonant cicuit and the associated output terminal, a second condition for providing a current path for unidirectional current flow of the first polarity between the associated output terminal and said resonant circuit, and a third condition for preventing current flow therebetween;
  control means for operating said first and second input switching means and said first, second and third output switching means in predetermined, repetitive patterns over a number of operating cycles of said converter for (a) supplying current to a load connected to said first, second and third output terminals, and (b) selectively charging and discharging said first, second, and third output capacitors to obtain a desired level of voltage at the output terminals at any given time; the sum of the voltages developed across said first, second and third output capacitors being zero at any given time, the voltage developed across said shuttle capacitor reversing polarity during each half-cycle of said converter operation between absolute levels of 2E volts at the beginning and end of each such half-cycle by maintaining a zero average magnitude of current flow over each cycle of operation of said converter, whereby for each such cycle, the operation of said first and second input switching means, and said first, second and third output switching means is such that over a first quarter cycle of converter operation a unidirectional current path is provided for current of the second polarity flowing between a first one of said power terminals sources and a first of said output capacitors, over a second quarter cycle of converter operation a unidirectional current path is provided for current of the second polarity flowing between the second power terminal and the first output capacitor, over a third quarter cycle of converter operation a unidirectional current path is provided for current of the first polarity flowing between a second of said output capacitors and the second power terminal, and over a fourth quarter cycle of converter operation a unidirectional current path is provided for current of the first polarity flowing between the second output capacitor and the first power terminal, the interval of each quarter cycle being approximately one-half the period of a resonant frequency cycle of said series resonant circuit.

43. The converter of claim 42 wherein each of said first and second input switching means includes a pair of silicon-controlled-rectifiers connected in antiparallel.

44. The converter of claim 42 wherein said first input switching means includes:
   a first silicon-controlled-rectifier having anode and cathode electrodes respectively connected to said first power terminal and to said series resonant circuit; and
   a first diode having cathode and anode electrodes respectively connected to said first power terminal and to said series resonant circuit.

45. The converter of claim 44 wherein said second input switching means includes:
   a second silicon-controlled-rectifier having cathode and anode electrodes respectively connected to said second power terminal and to said series resonant circuit; and
   a second diode having anode and cathode electrodes respectively connected to said second power terminal and to said series resonant circuit.

46. The converter of claim 42 wherein said first input switching means includes:
   a first power switching transistor having a main current path connected between and polarized for unidirectionally conducting current from said first power terminal to said series resonant circuit; and
   a first diode having a cathode electrode connected to said first power terminal and an anode electrode connected to said series resonant circuit.

47. The converter of claim 44 wherein said second input switching means includes:
   a second power switching transistor having a main current path connected between and polarized for unidirectionally passing current from said series resonant circuit to said second power terminal; and
   a second diode having an anode electrode connected to said second power terminal and a cathode electrode connected to said series resonant circuit.

48. The converter of claim 41 wherein each of said first, second, and third output switching means includes a pair of silicon-controlled-rectifiers connected in antiparallel.

49. A charge transfer regulator converter for converting DC to AC, comprising:
   first and second output terminals connected to a load;
   a reference terminal connected to a source of reference potential;
   first and second output capacitors connected individually between said first output and reference terminals, and said second output and reference terminals, respectively;
   first and second power terminals connected to sources of DC voltage having levels of +E and −E volts, respectively;
   a series resonant circuit including a shuttle inductor and a shuttle capacitor;
   first and second input switching means respectively connected to said first and second power terminals, said first and second input switching means having a common connection to one end of said resonant circuit, and being respectively operable to: (a) a first condition for providing a current path for unidirectional current flow from the first and second power terminals to said resonant circuit, (b) a second condition for providing a current path for unidirectional current flow from said resonant circuit to the first and second power terminals, and (c) a condition for preventing current flow between the first and second power terminals and the resonant circuit;
   first and second output switching means each having a common connection to said resonant circuit and respectively connected to said first and second output terminals, each of said first and second output switching means being respectively operable to: (a) a first condition for providing a current path for unidirectional current flow from said resonant circuit to the first and second output terminals, (b) a second condition for providing a current path for unidirectional current flow from the first and second output terminals to said resonant circuit, and (c) an open circuit condition for preventing current flow between the first and second output terminals and the resonant circuit;
   control means for operating said first and second input and output switching means in predetermined, repetitive patterns over a number of operating cycles of said converter for charging and discharging said first and second output capacitors to obtain a desired level of voltage therebetween at any given time and for supplying current to a load connected between said first and second output terminals, the voltage developed across said shuttle capacitor reversing polarity during each half-cycle of said converter operation between absolute levels of 2E volts at the beginning and end of each such half-cycle by maintaining a zero average current flow over each cycle of operation of said converter, whereby for each such cycle, the operation of said first and second input and output switching means is such that over a first quarter cycle of converter operation a unidirectional current path is provided for permitting current to flow in a first direction between a first of power terminals and a first of said output capacitors, over a second quarter cycle of converter operation a unidirectional current path is provided for permitting current to flow in the first direction between the other of said power terminals and the first output capacitor, over a third quarter cycle of converter operation a unidirectional current path is provided for permitting current to flow in the second direction between the other output capacitor and the second one of said power terminals, and over a fourth quarter cycle of the converter operation a unidirectional current path is provided for permitting current to flow in the second direction between the second output capacitor and the first power terminal, the duration of each one-quarter cycle of operation of said converter being approximately equal to one-half the period of one cycle of the resonant frequency of said series resonant circuit.

50. The converter of claim 49 wherein each of said first and second input switching means includes a pair of blocking silicon-controlled-rectifiers connected in antiparallel.

51. The converter of claim 49 wherein each of said first and second input switching means includes an asymmetrical silicon-controlled-rectifier, and a diode connected in antiparallel therewith.

52. The converter of claim 49 wherein each of said first and second input switching means includes a switching transistor, and a diode connected in antiparallel therewith.

53. The converter of claim 49 wherein each of said first and second output switching means includes a pair of blocking silicon-controlled-rectifiers connecting in antiparallel.

54. The converter of claim 49 wherein each of said first and second output switching means includes a switching transistor, and a diode converted in antiparallel therewith.

55. The converter of claim 49 wherein each of said first and second input switching means includes a pair of switching transistors connected in antiparallel.

56. The converter of claim 49 wherein each of said first and second output switching means includes a pair of switching transistors connected in antiparallel.

* * * * *